(12) United States Patent
Kawakami et al.

(10) Patent No.: US 6,940,605 B2
(45) Date of Patent: Sep. 6, 2005

(54) METHOD FOR MEASURING INTERFERENCE AND APPARATUS FOR MEASURING INTERFERENCE

(75) Inventors: Jun Kawakami, Tokyo (JP); Hisashi Shiozawa, Tokyo (JP)

(73) Assignee: Nikon Corporation, Tokyo (JP)

(*) Notice: Subject to any disclaimer, the term of this patent is extended or adjusted under 35 U.S.C. 154(b) by 304 days.

(21) Appl. No.: 10/276,724

(22) PCT Filed: May 18, 2001

(86) PCT No.: PCT/JP01/04147
§ 371 (c)(1),
(2), (4) Date: Nov. 18, 2002

(87) PCT Pub. No.: WO01/90689
PCT Pub. Date: Nov. 29, 2001

(65) Prior Publication Data
US 2003/0174342 A1 Sep. 18, 2003

(30) Foreign Application Priority Data
May 22, 2000 (JP) ...................... 2000-149533

(51) Int. Cl.[7] .............................................. G01B 9/02
(52) U.S. Cl. ...................................................... 356/511
(58) Field of Search .......................... 356/511–514, 516

(56) References Cited

U.S. PATENT DOCUMENTS 6,020,965 A * 2/2000 Endo ........................... 356/496
6,061,136 A * 5/2000 Hayashi ....................... 356/495

FOREIGN PATENT DOCUMENTS

| JP | 7-198319 | 8/1995 |
| JP | 8-159709 | 6/1996 |

* cited by examiner

Primary Examiner—Andrew H. Lee
(74) Attorney, Agent, or Firm—Morgan, Lewis & Bockius LLP

(57) ABSTRACT

Both the optical distance of the detected-light light path and the optical distance of the reference-light light path are simultaneously varied according to respective specified patterns, so that differences are created between the period of variation in the intensity of the required signal component (in the interference signals) and the periods of variation in the intensities of the coherent noise components. When the modulation scanning procedure is performed, the phase difference between the detected light and reference light in a specified state is determined as shape information for the above-mentioned detected surface on the basis of the interference signals output from the light-receiving element. As a result, it is possible to securely reduce the effects of coherent noise components generated as a result of the interference of specified noise light that has passed through at least portions of the detected-light light path and reference-light light path with the detected light or reference light.

9 Claims, 8 Drawing Sheets

(a)

(b)

(c)

$(B_0, B_1, B_2, B_3)$ （実測値）

Equation (8a) ← ( ← Equation (4) )

$$\phi_0 = \tan^{-1}\left[\frac{(B_0 - B_2)}{(B_1 - B_3)}\right] \cdots (8a)$$

$\phi_0$

METHOD FOR MEASURING INTERFERENCE AND APPARATUS FOR MEASURING INTERFERENCE

TECHNICAL FIELD

The present invention relates to an interference measurement method using an interferometer, and an interference measuring apparatus. More particularly, the present invention relates to an interference measurement method and interference measuring apparatus which performs a scan (fringe scan) that varies the phase difference between detected light from a detected surface and reference light from a reference surface, and determines the phase difference between the above-mentioned detected light and the above-mentioned reference light in a specified state as shape information relating to the above-mentioned detected surface on the basis of the interference signal that is obtained as a result.

BACKGROUND ART

FIG. 7 is a structural diagram of a conventional interference measuring apparatus 70 used to measure the surface shape of a detected surface 72.

In this interference measuring apparatus 70, light that is emitted from a light source 71 is conducted to both the detected surface 72 and a reference surface 73, and detected light 72a that is generated by the reflection of this light from the detected surface 72 and reference light 73a that is generated by the reflection of this light from the reference surface 73 interfere with each other, so that interference fringes are generated; these interference fringes are then detected by an imaging element 76 such as a CCD imaging element. The two-dimensional distribution of the phase difference between the detected light 72a and reference light 73a can be ascertained from the interference fringes that are thus detected, and the surface shape of the detected surface 72 (using the reference surface 73 as a standard) is expressed by this two-dimensional distribution.

In cases where an even greater increase in precision is desired, the fringe scanning interference method described below is employed.

In this fringe scanning interference method, the reference surface 73 is moved by an amount equal to approximately ½ wavelength by means of a moving mechanism 77 such as a piezo-electric element, so that the optical distance between the detected light 72a and reference light 73a is varied (fringe scan) by an amount equal to approximately one wavelength (one period in terms of the phase difference), and the value of the phase difference (initial phase difference) between the detected light 72a and reference light 73a in a specified state (e.g., the initial state at the time that the fringe scan is initiated) is accurately determined by detecting the variation in the optical density of the interference fringes in this case. Furthermore, the same result can also be obtained by moving the detected surface 72 by an amount equal to approximately ½ wavelength.

Generally, the interference measuring apparatus 70 is set so that the position of the reference surface 73 varies linearly with respect to time during this fringe scan (this is accomplished by the setting of the moving mechanism 77 and a control circuit 78).

Furthermore, in the imaging element 76, charges with quantities that correspond to the intensity of the incident light are accumulated for each unit time $T_c$ in the respective pixels disposed on the light-receiving surface, and the values of the incident light intensity integrated over this time $T_c$, i.e., the cumulative data $B_0$, $B_1$, $B_2$, ... are successively output. These cumulative data $B_0$, $B_1$, $B_2$, ... are used as interference signals.

Assuming that the initial phase difference between the detected light 72a and reference light 73a at a certain point A of the interference fringes is $\phi_0$, then, if the amount of variation in the phase difference per unit time $T_c$ is set equal to $2\pi a$ (a constant), the phase difference $\phi(t)$ between the detected light 72a and reference light 73a at the point in time where time t has elapsed from the initiation of the fringe scan can be expressed by Equation (1).

$$\phi(t) = \frac{2\pi a}{T_c}t + \phi_0 \qquad (1)$$

Furthermore, the intensity I(t) of the interference light generated by the detected light 72a and reference light 73a can be expressed by Equation (2) using this phase difference $\phi(t)$. Moreover, $I_0$ and $\gamma$ are respective numbers (constants) that are determined by the intensity (amplitude) of the light emitted from the light source 71, etc.

$$I(t)=I_0[1+\gamma \cos (\phi(t))] \qquad (2)$$

Furthermore, the relationship between the intensity I(t) of the interference light and the cumulative data $B_0$, $B_1$, $B_2$, ... constituting the time-integrated values of the interference light intensity over the time $T_c$ can be expressed by Equation (3).

$$B_k = \int_{\frac{(2k-1)}{2}T_c}^{\frac{(2k+1)}{2}T_c} I(t)dt \qquad (3)$$

Accordingly, the respective cumulative data $B_0$, $B_1$, $B_2$, ... can be expressed by Equation (4).

$$B_k = I_0 T_c + \frac{I_0 \gamma T_c}{\pi a}\sin \pi a \cos(2\pi ak + \phi_0) \qquad (4)$$

If this Equation (4) is transformed, Equation (5) and Equation (6) are obtained.

$$B_k = I_0 T_c + \frac{I_0 \gamma T_c}{\pi a}\sin \pi a \cos 2\pi ak \cos\phi_0 - \qquad (5)$$
$$\frac{I_0 \gamma T_c}{\pi a}\sin \pi a \sin 2\pi ak \sin\phi_0$$
$$= D + X_k \cdot C - Y_k \cdot S$$
$$\because D = I_0 T_c,\ C = I_0 \gamma T_c \cos\phi_0,\ S = I_0 \gamma T_c \sin\phi_0$$
$$X_k = \frac{1}{\pi a}\sin \pi a \cos 2\pi ak,\ Y_k = \frac{1}{\pi a}\sin \pi a \sin 2\pi ak$$

$$\phi_0 = \tan^{-1}(S/C) \qquad (6)$$

Furthermore, Equation (7), in which the amount of variation $2\pi a$ in the phase difference per unit time $T_c$ is expressed in terms of the four cumulative data $B_0$, $B_1$, $B_3$ and $B_4$, is derived from the above Equation (4).

$$2\pi a = \cos^{-1}\left(\frac{1}{2}\frac{B_4 - B_0}{B_3 - B_1}\right) \quad (7)$$

On the basis of these relationships, the calculating circuit 79 of the interference measuring apparatus 70 determines the value of a by applying Equation (7) to the respective cumulative data $B_0$, $B_1$, $B_2$, . . . (actually measured values) output by the imaging element 76, and further determines the value of the initial phase difference $\phi_0$ from the determined value of a and Equations (5) and (6).

Furthermore, the calculation of the value of this initial phase difference $\phi_0$ is respectively performed for the output of each pixel of the imaging element 76, and the two-dimensional distribution of the initial phase difference $\phi_0$ thus calculated is output to a display device (not shown in the figures) such as a monitor as shape information for the detected surface 72 using the reference surface 73 as a standard.

Here, in such a fringe scanning interference method, the calculations can be simplified by limiting the manner of movement of the reference surface 73.

For example, if the amount of variation $2\pi a$ in the phase difference between the detected light 72a and reference light 73a per unit time $T_c$ is set so that this amount of variation is $\pi/2$ (i.e., so that a=¼) as shown in FIG. 8(a), then the initial phase difference $\phi_0$ can be directly determined from four consecutive cumulative data, e.g., $B_0$, $B_1$, $B_2$ and $B_3$ (actually measured values), or five consecutive cumulative data, e.g., $B_0$, $B_1$, $B_2$, $B_3$ and $B_4$ (actually measured values), by means of the following Equation (8a) or (8b) (both of these equations are equations derived by setting a so that a=¼ in Equation (4)) (see FIGS. 8(b) and 8(c)):

$$\phi_0 = \tan^{-1}\left(\frac{B_0 - B_2}{B_1 - B_3}\right) \quad (8a)$$

$$\phi_0 = \tan^{-1}\left(\frac{\frac{B_0 + B_4}{2} - B_2}{B_1 - B_3}\right) \quad (8b)$$

Furthermore, the method in which the initial phase difference $\phi_0$ is determined by means of Equation (8a) from four cumulative data is called the "4-bucket method," and the method in which the initial phase difference $\phi_0$ is determined by means of Equation (8b) from five cumulative data (in this case, the fringe scan is performed for a period of at least (1+¼) in terms of the phase difference) is called the "5-bucket method." The 5-bucket method requires a longer processing time than the 4-bucket method, since the number of cumulative data on which the method is based is greater by 1; however, the precision is correspondingly higher.

In the respective cumulative data $B_0$, $B_1$, $B_2$, . . . (actually measured values) output by the imaging element 76, a coherent noise component (caused by interference light constituted by noise light that is incident on the imaging element 76 due to excess reflection) is superimposed in addition to the required signal component (based on interference light constituted by the reference light 73a and detected light 72a).

Here, as is indicated by the fine lines in FIG. 7, the noise light consists of noise light that is a part of the light emitted from the light source 71, and that is reflected from some location inside the interferometer 75 so that this light interferes with the detected light 72a or reference light 73a without passing by way of the detected surface 72 or reference surface 73 (noise light b (N)), and noise light that is a part of the light reflected from the detected surface 72 or reference surface 73, and that is reflected by the surfaces of the interference optical system 74 or the emission port of the light source 71, etc., so that this light again travels toward the detected surface 72 or reference surface 73, and interferes with the detected light 72a or reference light 73a after being reflected by the detected surface 72 or reference surface 73 (noise light c (WNW), noise light d (WNR), noise light e (RNR) and noise light f (RNW)).

Furthermore, the alphabetic characters in parentheses indicate the reflection path. Specifically, the reflection path of the detected surface 72 is indicated by W, the reflection path of the reference surface 73 is indicated by R, and the reflection path of any location inside the interferometer 75 is indicated by N (since the reflectivity of any location inside the interferometer 75 is sufficiently smaller than the reflectivity of the detected surface 72 or reference surface 73, noise light that has been reflected two or more times at such a location can be ignored).

It is desirable that the coherent noise components that are superimposed on the interference signals by such noise light b, c, d, e and f be separated from the required signal components and eliminated by some type of operation.

However, in the case of a conventional interference measuring apparatus 70, as is also clear from the application of the above-mentioned Equations (8a) and (8b), it is considered that coherent noise components are not superimposed on the cumulative data $B_0$, $B_1$, $B_2$, . . . (actually measured values); accordingly, the initial phase difference $\phi_0$ that is finally determined as the shape information contains error.

Here, in the case of coherent noise components that vary with a different period than that of the required signal components, these noise components can be separated from these signal components by some type of operation; however, coherent noise components that vary with the same period as that of the required signal components cannot be separated even if some type of operation is applied.

Incidentally, among the coherent noise components occurring in the interference measuring apparatus 70, the component generated by the interference of the noise light b with the reference light 73a, the component generated by the interference of the noise light c with the reference light 73a, the component generated by the interference of the noise light d with the detected light 72a, the component generated by the interference of the noise light e with the reference light 73a and the component generated by the interference of the noise light f with the reference light 73a vary with the same period as that of the required signal components as the reference surface 73 moves; accordingly, separation (i.e., elimination) of these noise components is impossible (details will be described later; see Table 2).

It is conceivable that the generation itself of the noise light b, c, d, e and f causing the coherent noise components might be avoided by altering the optical elements inside the interferometer 75; however, since noise light generated in accordance with the reflectivity values and disposition angles of the surfaces of the optical elements may be generated to a considerable extent regardless of the optical elements that make up the interferometer, complete avoidance is impossible.

Conventionally, therefore, suppression of the effects of coherent noise components has been viewed as impossible, whether by altering the contents of the calculations or altering the hardware, and all that has been done is to accomplish a slight suppression of the intensity of coherent noise components by forming anti-reflection films on the surfaces of the optical elements, or inserting elements for the purpose of removing excess reflected light from the light path.

DISCLOSURE OF THE INVENTION

The object of the present invention is to provide an interference measurement method and interference measuring apparatus which can reliably reduce the effects of coherent noise components by applying the above-mentioned fringe scanning interference method.

Specifically, the first invention of the present application is an interference measurement method using an interferometer comprising an interference optical system which conducts light emitted from a light source to both a detected surface and a reference surface, and which causes interference between detected light that is generated by the reflection of the above-mentioned light from the above-mentioned detected surface and reference light that is generated by the reflection of the above-mentioned light from the above-mentioned reference surface, and a light-receiving element which is disposed in the light path of the interference light formed by the above-mentioned detected light and the above-mentioned reference light, and which outputs interference signals corresponding to the intensity of the incident light, wherein said interference measurement method includes a modulation scanning procedure which creates a difference between the period of variation in the intensity of the required signal components in the above-mentioned interference signals that vary according to the phase difference between the above-mentioned reference light and the above-mentioned detected light, and the period of variation in the intensity of the coherent noise components that are generated as a result of specified noise light that has passed through at least portions of the light path of the above-mentioned detected light and the light path of the above-mentioned reference light interfering with the above-mentioned detected light or the above-mentioned reference light, by simultaneously varying both the optical distance of the above-mentioned detected-light light path and the optical distance of the above-mentioned reference-light light path in respective specified patterns during a scan that varies the phase difference between the above-mentioned detected light and the above-mentioned reference light, and a calculation procedure which determines the phase difference between the above-mentioned detected light and the above-mentioned reference light in a specified state as shape information for the above-mentioned detected surface on the basis of the interference signals that are output from the above-mentioned light-receiving element when the above-mentioned modulation scanning procedure is being performed.

Generally, two signals with mutually different periods of variation can be separated from each other by a mathematical operation. Accordingly, the required signal components and coherent noise components in which a difference has been created in the periods of variation in the intensity of the respective components by the above-mentioned modulation scanning procedure can be separated from each other by a mathematical operation. Consequently, in the present invention, even if coherent noise components of the type described above are superimposed on the interference signals output by the light-receiving element, the effects of such superimposed coherent noise components can be eliminated by a calculation procedure that is subsequently performed. In the present invention, therefore, the effects of coherent noise components are reliably reduced, so that shape information can be determined with a high degree of precision.

The second invention of the present application is the above-mentioned first invention, wherein the ratio of the amount of variation in the optical distance of the above-mentioned detected-light light path to the amount of variation in the optical distance of the above-mentioned reference-light light path is maintained at 1:−1 in the above-mentioned modulation scanning procedure.

Here, the noise light that causes the superimposition of coherent noise components consists of noise light that constitutes a portion of the light emitted from the light source, and that is reflected at some location inside the interferometer so that this light interferes with the detected light or reference light without passing by way of the detected surface or reference surface, and noise light that constitutes a portion of the reflected light reflected from the detected surface or reference surface, and that is reflected by the surfaces of the interference optical system or the emission port of the light source, etc., so that this light again travels toward the detected surface or reference surface, and interferes with the detected light or reference light after being reflected by the detected surface or reference surface.

However, in the above-mentioned modulation scanning procedure, since the ratio of the amount of variation in the optical distance of the above-mentioned detected-light light path to the amount of variation in the optical distance of the above-mentioned reference-light light path is maintained at 1:−1, the period of variation in the intensity of at least the coherent noise components formed by these noise light components differs from the period of variation in the intensity of the required signal components. In other words, the effects of these coherent noise components can be reliably eliminated by a calculation procedure that is subsequently performed.

Furthermore, noise light that is reflected two or more times from some location inside the interferometer is generated; however, since the reflectivity of such locations is sufficiently smaller than the reflectivity of the detected surface or reference surface, the coherent noise components constituted by such noise light are sufficiently smaller than the coherent noise components mentioned above. Accordingly, if this interference measurement method is used, the effects of coherent noise components can be suppressed to a sufficiently low level.

Moreover, in regard to the ratio of the amounts of movement effected by the modulation scanning means, there are means in which a similar effect can also be obtained at values other than a ratio of 1:−1. However, the use of a ratio of 1:−1 is desirable in that the total of the amounts of variation in the optical distances of the detected-light light path and reference-light light path can be suppressed to a small value.

The third invention of the present application is the above-mentioned first invention, wherein the ratio of the amount of variation in the optical distance of the above-mentioned detected-light light path to the amount of variation in the optical distance of the above-mentioned reference-light light path is maintained at 1:3 or 3:1 in the above-mentioned modulation scanning procedure.

In cases where this ratio is maintained, the period of variation in the intensity of the coherent noise components caused by the same noise light as in the above-mentioned second invention differs from the period of variation in the intensity of the required signal components; accordingly, as in the above-mentioned second invention, the effects of these coherent noise components can be suppressed to a sufficiently low level.

Furthermore, when such a ratio of 1:3 or 3:1 is used as the ratio of the amounts of movement, the total of the amounts of variation in the optical distances is greater than in the case of a ratio of 1:−1; however, this total can be suppressed to a smaller amount than in cases where some other ratio is set.

The fourth invention of the present application is any of the above-mentioned first through third inventions, wherein the above-mentioned scan is performed for a period equal to at least twice the period of the variation in the intensity of the above-mentioned required signal components in the above-mentioned modulation scanning procedure, and the above-mentioned shape information for the detected surface is determined on the basis of the above-mentioned interference signal corresponding to a period equal to at least twice the period of the variation in the intensity of the above-mentioned required signal components in the above-mentioned calculation procedure.

If the interference signal on which the calculations are based is thus set equal to two periods, the periodic characteristics of the required signal components and the periodic characteristics of the coherent noise components can be utilized to remove the coherent noise components, so that only the required signal components are allowed to remain. As a result, the effects of the coherent noise components can be reliably suppressed.

The fifth invention of the present application is an interference measuring apparatus comprising an interference optical system which conducts light emitted from a light source to both a detected surface and a reference surface, and which causes interference between detected light that is generated by the reflection of the above-mentioned light from the above-mentioned detected surface and reference light that is generated by the reflection of the above-mentioned light from the above-mentioned reference surface, a light-receiving element which is disposed in the light path of the interference light formed by the above-mentioned detected light and the above-mentioned reference light, and which outputs interference signal is corresponding to the intensity of the incident light, a moving means which simultaneously moves both the optical distance of the above-mentioned detected-light light path and the optical distance of the above-mentioned reference-light light path, a modulation scanning means which creates a difference between the period of variation in the intensity of the required signal components in the above-mentioned interference signals that vary according to the phase difference between the above-mentioned reference light and the above-mentioned detected light, and the period of variation in the intensity of the coherent noise components that are generated as a result of specified noise light that has passed through at least portions of the light path of the above-mentioned detected light and light path of the above-mentioned reference light interfering with the above-mentioned detected light or the above-mentioned reference light, by simultaneously varying both the optical distance of the above-mentioned detected-light light path and the optical distance of the above-mentioned reference-light light path in respective specified patterns by the operation of the above-mentioned moving means during a scan that varies the phase difference between the above-mentioned detected light and the above-mentioned reference light, and a calculating means which determines the phase difference between the above-mentioned detected light and the above-mentioned reference light in a specified state as shape information for the above-mentioned detected surface on the basis of the interference signals output from the above-mentioned light-receiving element during the scan performed by the above-mentioned modulation scanning means.

The sixth invention of the present application is the above-mentioned fifth invention, wherein the above-mentioned modulation scanning means has the function of maintaining the ratio of the amount of variation in the optical distance of the above-mentioned detected-light light path to the amount of variation in the optical distance of the above-mentioned reference-light light path at a ratio of 1:−1.

The seventh invention of the present application is the above-mentioned fifth invention, wherein the above-mentioned modulation scanning means has the function of maintaining the ratio of the amount of variation in the optical distance of the above-mentioned detected-light light path to the amount of variation in the optical distance of the above-mentioned reference-light light path at a ratio of 1:3 or 3:1.

The eighth invention of the present application is any of the above-mentioned fifth through seventh inventions, wherein the above-mentioned modulation scanning means performs the above-mentioned scan for a period equal to at least twice the period of the variation in the intensity of the above-mentioned required signal components, and the above-mentioned calculating means determines the above-mentioned shape information for the detected surface on the basis of the above-mentioned interference signals corresponding to a period that is at least twice the period of the variation in the intensity of the above-mentioned required signal components.

The interference measurement methods constituting the above-mentioned first through fourth inventions are automatically performed using the interference measuring apparatuses constituting the above-mentioned fifth through eighth inventions.

The ninth invention of the present application is an interference measuring apparatus in which differences in a detected surface with respect to a reference surface are measured by emitting light from a light source and causing the light reflected from the detected surface that is the object of measurement to interfere with the light reflected from the reference surface, wherein said interference measuring apparatus has a light path length varying means that synchronously varies the respective light path lengths of the light rays that pass by way of the above-mentioned detected surface and the light rays that pass by way of the above-mentioned reference surface.

In this means, a difference can be synchronously created in the periods of the required signal components and coherent noise components; accordingly, the required signal components and coherent noise components can be separated, and the coherent noise components can be removed.

BEST MODE CARRYING OUT THE INVENTION

Examples of preferred embodiments of the present invention will be described below with reference to the attached figures. However, it goes without saying that the scope of the present invention is not limited to the scope of these embodiments.

<First Embodiment>

A first embodiment of the present invention will be described below with reference to FIGS. 1, 2, 3 and 4 (Construction of First Embodiment).

Figure 1:
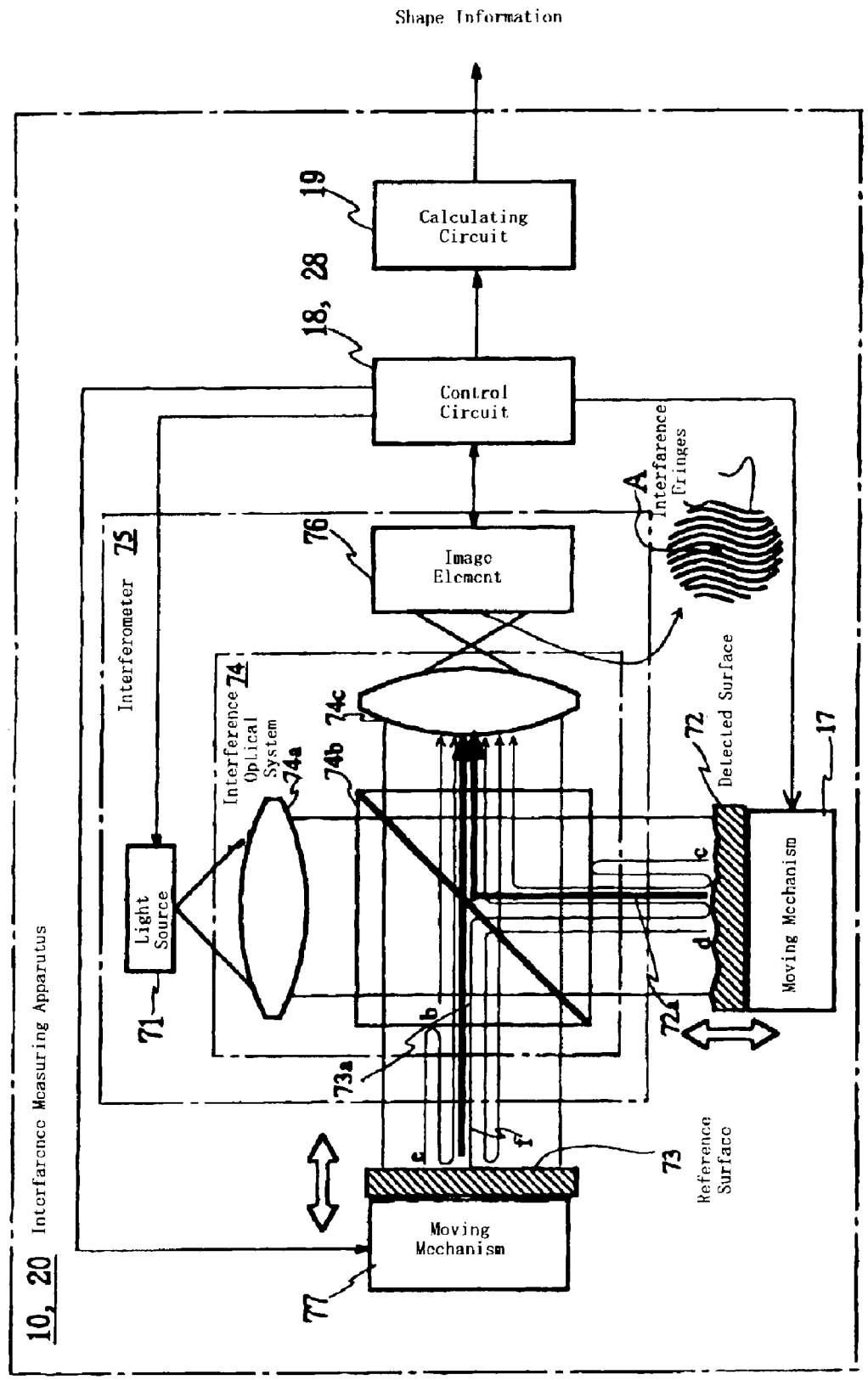
FIG. 1 is a structural diagram of the interference measuring apparatus in the first and second embodiments.

FIG. 1 is a structural diagram of the interference measuring apparatus 10 of the present embodiment (and of the interference measuring apparatus 20 of a second embodiment that will be described later). In FIG. 1, parts that are the same as those of the conventional interference measuring apparatus 70 shown in FIG. 7 are labeled with the same symbols.

Figure 7:
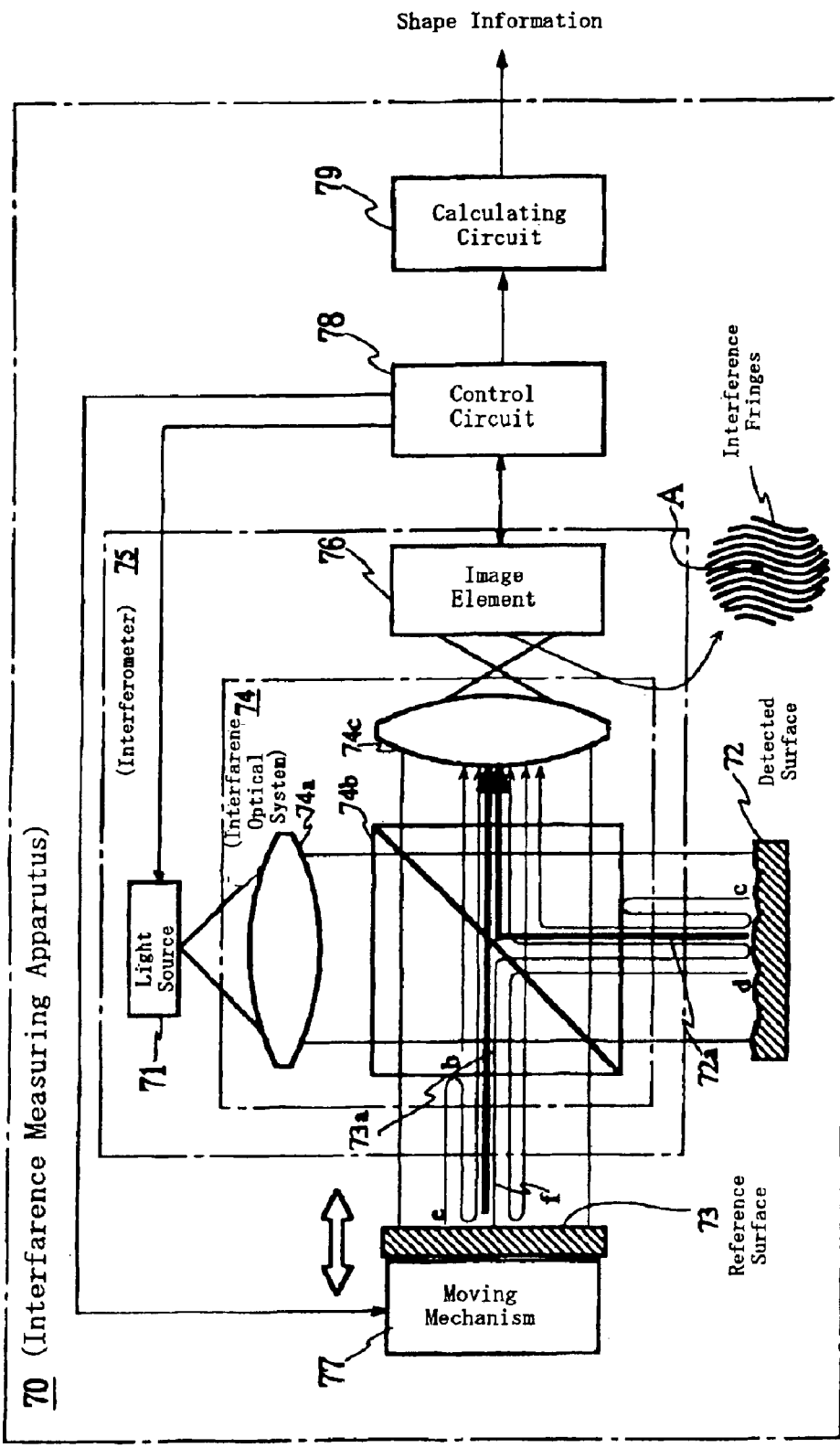
FIG. 7 is a structural diagram of a conventional interference measuring apparatus.
Figure 8:
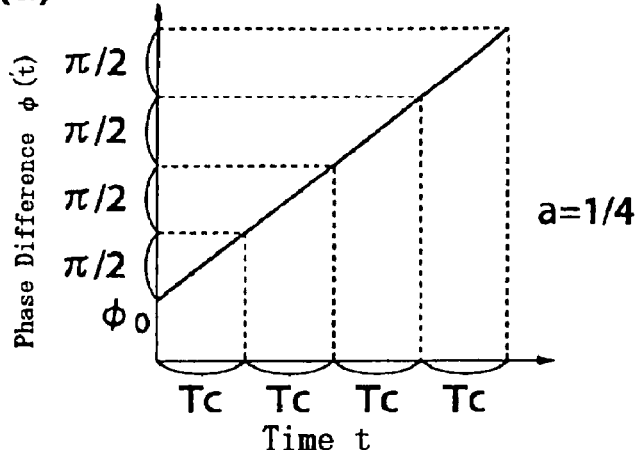
FIG. 8 is a diagram which illustrates the operation of a conventional interference measuring apparatus.
Figure 8:
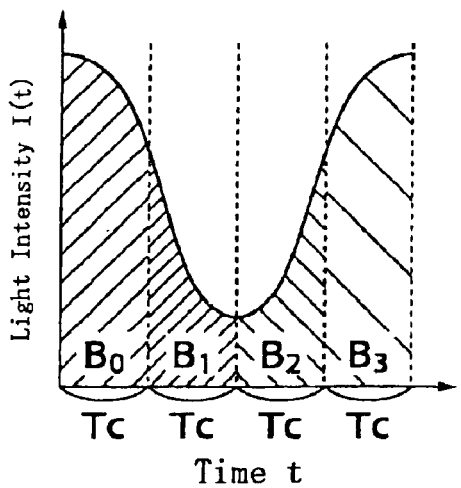

The interference measuring apparatus 10 is equivalent to an apparatus in which the interference measuring apparatus 70 shown in FIG. 7 is further provided with a moving mechanism 17 that moves the detected surface 72, a control circuit 18 is provided instead of the control circuit 78, and a calculating circuit 19 is provided instead of the calculating circuit 79. Specifically, the interference measuring apparatus 10 comprises a light source 71, an interference optical system 74 (beam splitter 74b, beam expander 74a and image-focusing lens 74c, etc.), an imaging element 76, two moving mechanisms 77 and 17, a control circuit 18, and a calculating circuit 19 (the system consisting of the light source 71, interference optical system 74 and imaging element 76 will hereafter be referred to as the interferometer 75).

Among these parts, the interference optical system 74 is a system that conducts light emitted from the light source 71 to both the detected surface 72 and the reference surface 73, and that causes detected light 72a generated by the reflection of this light from the detected surface 72 and reference light 73a generated by the reflection of this light from the reference surface 73 to interfere with each other.

The moving mechanism 17 is a mechanism that moves the detected surface 72 in the direction of the optical axis by a distance corresponding to the applied driving voltage in order to vary the optical distance of the light path of the detected light 72a, while the moving mechanism 77 is a mechanism that moves the reference surface 73 in the direction of the optical axis by a distance corresponding to the applied driving voltage in order to vary the optical distance of the light path of the reference light 73a. For example, these moving mechanisms 17 and 77 consist of piezo-electric elements; in the present embodiment, elements that have the same characteristics are used.

The imaging element 76 is a CCD type imaging element, etc., which is disposed in the light path of the interference light formed by the detected light 72a and reference light 73a. When this imaging element 76 is driven by the control circuit 18, the imaging element 76 accumulates a charge corresponding to the intensity of the incident light in each pixel for each unit time $T_c$, and successively outputs cumulative data $B_0, B_1, B_2, \ldots$ (actually measured values) which are signals indicating the time-integrated values of the incident light intensity over the time $T_c$ (in the present specification, subscripts are appended in the order of acquisition). In the interference measuring apparatus 10, these cumulative data $B_0, B_1, B_2, \ldots$ (actually measured values) are utilized as interference signals that indicate the optical density of the interference fringes.

The control circuit 18 drives the light source 71 during fringe scanning, and applies driving voltages to the respective moving mechanisms 77 and 17 in specified patterns, so that the reference surface 73 and detected surface 72 are respectively moved in specified patterns. Furthermore, the control circuit 18 drives the imaging element 76 in this case, and sends the cumulative data $B_0, B_1, B_2, \ldots$ (actually measured values) that are output by the imaging element 76 to the calculating circuit 19.

The calculating circuit 19 performs specified mathematical operations on the cumulative data $B_0, B_1, B_2, \ldots$ (actually measured values) when the calculating circuit 19 determines the phase difference (e.g., the initial phase difference $\phi_0$) between the reference light 73a and detected light 72a in a specified state (e.g., the initial state at the time that the fringe scan is initiated). Furthermore, this calculating circuit 19 may also be installed outside the interference measuring apparatus 10. Moreover, it would also be possible to utilize a computer that performs the same operations as the calculating circuit 19 instead of the calculating circuit 19.

(Operation of First Embodiment)

Figure 2:
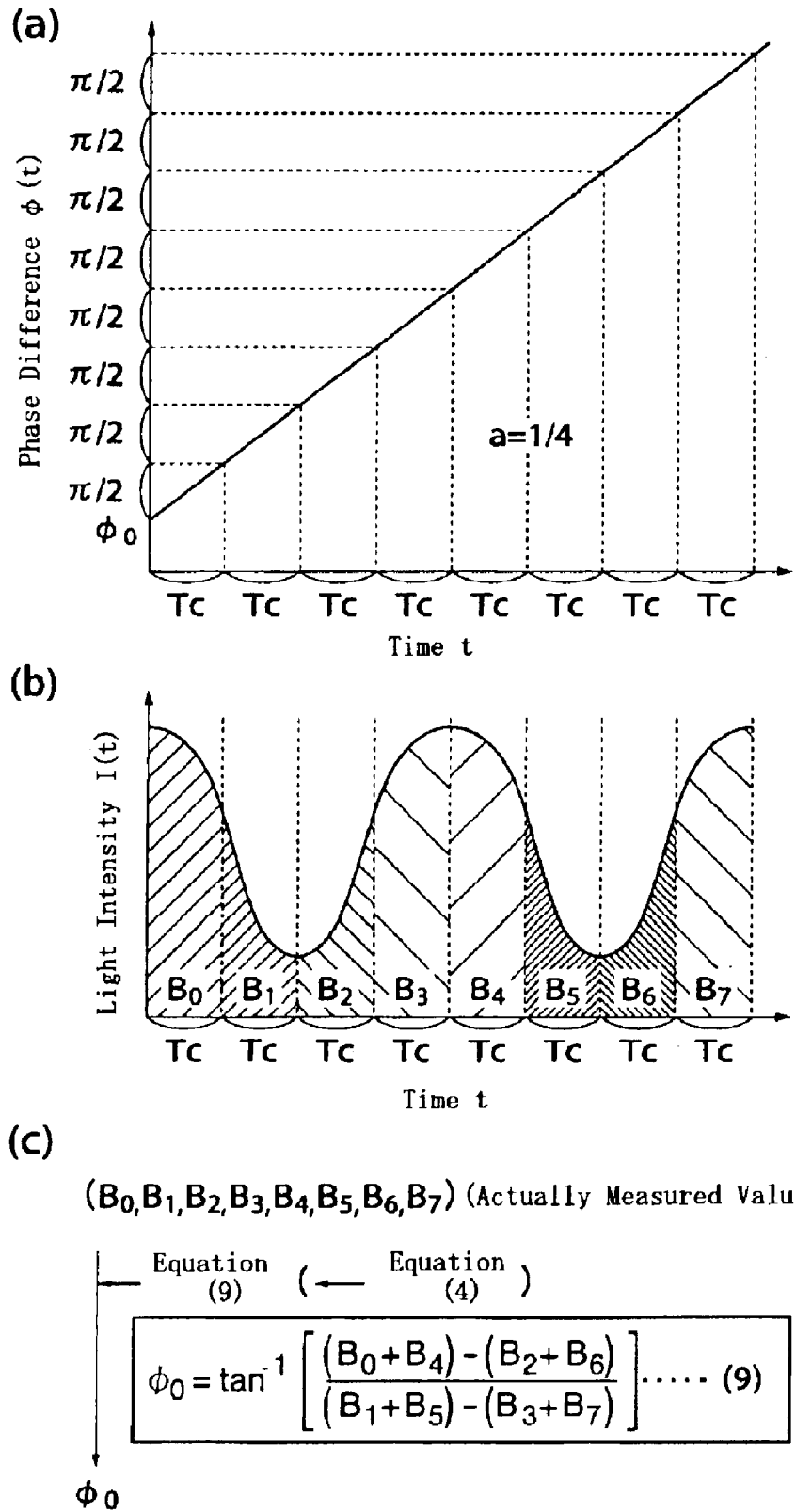
FIG. 2 is a diagram which illustrates the operation of the first, second and third embodiments.

FIG. 2 is a diagram that illustrates the operation of the present embodiment.

In the present embodiment, both the detected surface 72 and the reference surface 73 are simultaneously caused to move during the fringe scan in order to cause the period of variation in the intensity of the coherent noise components that are superimposed on the cumulative data $B_0, B_1, B_2, \ldots$ (actually measured values) to differ from the period of variation in the intensity of the required signal components. In this case, the ratio of the amount of movement of the detected surface 72 to the amount of movement of the reference surface 73 is maintained at 1:−1.

Furthermore, in order to obtain information corresponding to a period that is twice the period of the required signal components, the difference in the optical distances of the detected light 72a and reference light 73a is varied by an amount equal to at least twice the wavelength of the light that is emitted from the light source 71 (a period equal to two periods in terms of the phase difference), as is shown in FIG. 2(a).

Furthermore, as a condition for the application of Equation (9) (described later), the system is set so that the position of the reference surface 73 and the position of the detected surface 72 both vary linearly with a sufficient degree of precision with respect to time, and so that the amount of variation $2\pi a$ in the phase difference between the detected light 72a and reference light 73a per unit time $T_c$ is $\pi/2$ (i.e., so that $a=\frac{1}{4}$) (see FIG. 2(a)).

Specifically, during a period of 8 $T_c$, the control circuit 18 varies the driving voltage applied to the moving mechanism 77 in accordance with time so that the reference surface 73 is moved uniformly by an amount equal to ½ wavelength, and at the same time, the control circuit 18 varies the driving voltage applied to the moving mechanism 17 in accordance with time so that the detected surface 72 is moved uniformly by an amount equal to −½ wavelength. (Furthermore, the positive/negative difference in the amounts of movement corresponds to the difference in the direction of light path contraction/direction of light path expansion; however, either direction may be taken as positive).

As a result of this fringe scan, the cumulative data $B_0$, $B_1$, $B_2$, $B_3$, $B_4$, $B_5$, $B_6$ and $B_7$ (actually measured values) are successively obtained (see FIG. 2(b)). These respective cumulative data each correspond to a period equal to ¼ of the period of the required signal components, so that these cumulative data overall correspond to data equal to a period that is twice the period of the required signal components.

Furthermore, in determining the initial phase difference $\phi_0$, the calculating circuit 19 of the present embodiment applies the following Equation (9) to the above-mentioned cumulative data $B_0$, $B_1$, $B_2$, $B_3$, $B_4$, $B_5$, $B_6$ and $B_7$ (actually measured values) equal to two periods (see FIG. 2(c)) (furthermore, the meaning of this Equation (9) will be explained later).

$$\phi_0 = \tan^{-1}\left(\frac{(B_0 + B_4) - (B_2 + B_6)}{(B_1 + B_5) - (B_3 + B_7)}\right) \quad (9)$$

(Behavior of Coherent Noise Components in First Embodiment)

Here, the noise light components associated with coherent noise components in the interference measuring apparatus 10 are the noise light b (N), noise light c (WNW), noise light d (WNR), noise light e (RNR) and noise light f (RNW), as in a conventional technique.

Furthermore, the alphabetic characters shown in parentheses indicate the reflection paths. Specifically, the reflection path of the detected surface 72 is indicated by W, the reflection path of the reference surface 73 is indicated by R, and the reflection path of any location inside the interferometer 75 is indicated by N. Furthermore, since the reflectivity at any location inside the interferometer 75 is sufficiently lower than the reflectivity of the detected surface 72 or reference surface 73, noise light that is reflected two or more times at such locations can be ignored.

Next, the period of variation in the intensity of the required signal components and the period of variation in the intensity of the respective coherent noise components will be compared on the basis of Table 1.

Table 1 is a table that compares the differences in the light paths of the respective light components, and the amounts of variation in the light path differences, in the present embodiment.

TABLE 1

Table comparing differences in the light paths of the respective light components and the amounts of variation in the light path differences in the first embodiment.

| Name of light component (reflection path, amount of variation in light path) | | Detected light 72a (W, −1) | | | Reference light 73a (R, 1) | |
|---|---|---|---|---|---|---|
| Detected light 72a (W, −1) | | | | | | |
| Reference light 73a (R, 1) | M | W − R, | −2 | | | |
| Noise light b (N, 0) | 111 | W − N, | −1 | 121 | R − N, | 1 |
| Noise light c (WNW, −2) | 112 | −W + N, | −1 | 122 | R − 2W − N, | 3 |
| Noise light d (WNR, 0) | 113 | −R + N, | −1 | 123 | −W − N, | 1 |
| Noise light e (RNR, 2) | 114 | W −2R − N, | −3 | 124 | −R − N, | −1 |
| Noise light f (RNW, 0) | 115 | −R − N, | −1 | 125 | −W − N, | 1 |

(Amount of variation in light path of reference used as a standard)

In the present embodiment, as was described above, the amount of variation in the light path of the detected light 72*a* is "−1" when the amount of variation in the light path of the reference light 73*a* is "1." Accordingly, the amounts of variation in the light paths of noise light components b, c, d, e and f are respectively "0," "−2," "0," "2" and "0."

The period of variation in the intensity of the interference light formed by the reference light 73*a* and detected light 72*a* in this case, i.e., the period of variation in the intensity of the required signal component $S_M$, is indicated by the table cell M. In this table cell M, a light path difference of "W−R" between the reference light 73*a* and detected light 72*a*, and a light path difference variation amount of "−2," are indicated. The magnitude of this light path difference variation amount "−2" indicates the rate of variation in the intensity of the interference light formed by these two light components.

Hereafter, therefore, the period of the variation in the intensity of each interference light component will be expressed as the "magnitude of the amount of variation in the light path difference" of the two light components forming the interference light. Specifically, the required signal component $S_M$ varies with a period designated as "period 2."

Similarly, the coherent noise component $S_{111}$ generated by the interference of the noise light b with the detected light 72*a* varies with a period designated as "period 1" (see table cell 111).

Furthermore, the coherent noise component $S_{112}$ generated by the interference of the noise light c with the detected light 72*a* varies with a period designated as "period 1" (see table cell 112).

Furthermore, the coherent noise component $S_{113}$ generated by the interference of the noise light d with the detected light 72*a* varies with a period designated as "period 1" (see table cell 113).

Furthermore, the coherent noise component $S_{114}$ generated by the interference of the noise light e with the detected light 72*a* varies with a period designated as "period 3" (see table cell 114).

Furthermore, the coherent noise component $S_{115}$ generated by the interference of the noise light f with the detected light 72*a* varies with a period designated as "period 1" (see table cell 115).

Furthermore, the coherent noise component $S_{121}$ generated by the interference of the noise light b with the reference light 73*a* varies with a period designated as "period 1" (see table cell 121).

Furthermore, the coherent noise component $S_{122}$ generated by the interference of the noise light c with the reference light 73*a* varies with a period designated as "period 3" (see table cell 122).

Furthermore, the coherent noise component $S_{123}$ generated by the interference of the noise light d with the reference light 73*a* varies with a period designated as "period 1" (see table cell 123).

Furthermore, the coherent noise component $S_{124}$ generated by the interference of the noise light e with the reference light 73*a* varies with a period designated as "period 1" (see table cell 124).

Furthermore, the coherent noise component $S_{125}$ generated by the interference of the noise light f with the reference light 73a varies with a period designated as "period 1" (see table cell 125).

Specifically, in the present embodiment, differences are created between the periods of variation in the intensity of the respective coherent noise components $S_{111}$ through $S_{125}$ and the period of variation in the intensity of the required signal component $S_M$.

Figure 3:
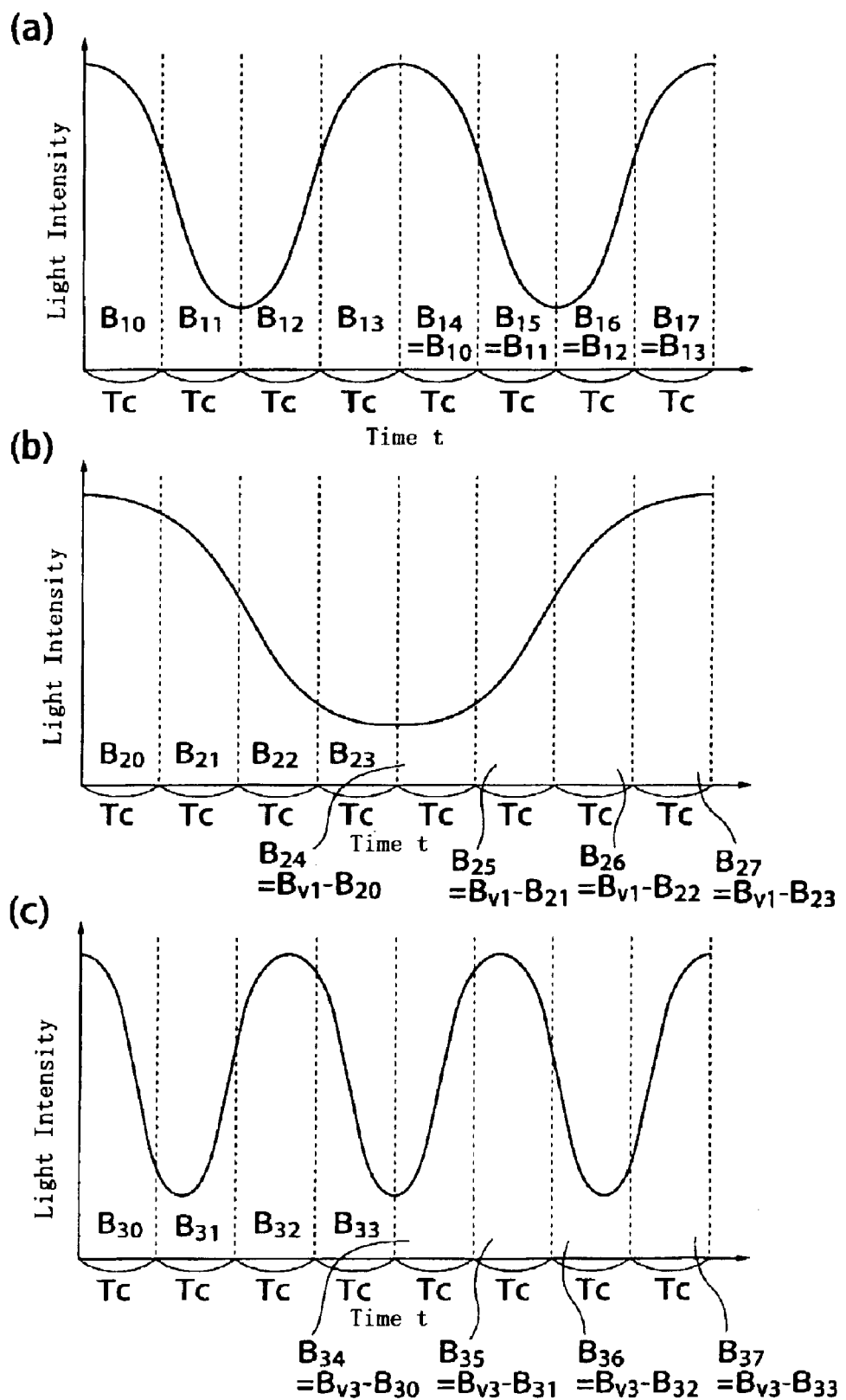
FIG. 3 is a diagram which compares the variation of the respective coherent noise components and the variation of the required signal components in the first embodiment.

FIG. 3 is a diagram which compares the variations of the respective coherent noise components $S_{111}$ through $S_{125}$ and the variation of the required signal component $S_M$ in the present embodiment. FIG. 3(a) shows a signal that varies with a period designated as "period 2" in the same manner as the required signal component $S_M$, while FIG. 3(b) shows a signal that varies with a period designated as "period 1," as in the case of the coherent noise components $S_{111}$, $S_{112}$, $S_{113}$, $S_{115}$, $S_{121}$, $S_{123}$, $S_{124}$ and $S_{125}$, and FIG. 3(c) shows a signal that varies with a period designated as "period 3," as in the case of the coherent noise components $S_{114}$ and $S_{122}$ (however, neither the amplitudes nor phases shown in FIG. 3 have meaning).

Accordingly, in the cumulative data $B_0$, $B_1$, $B_2$, $B_3$, $B_4$, $B_5$, $B_6$ and $B_7$ (actually measured values) that are output from the imaging element 76 during the above-mentioned fringe scan, it appears that the required signal components $B_{10}$, $B_{11}$, $B_{12}$, $B_{13}$, $B_{14}$, $B_{15}$, $B_{16}$ and $B_{17}$ (see FIG. 3(a)), which vary with a period designated as "period 2," the coherent noise components $B_{20}$, $B_{21}$, $B_{22}$, $B_{23}$, $B_{24}$, $B_{25}$, $B_{26}$ and $B_{27}$ (see FIG. 3(b)), which vary with a period designated as "period 1," and the coherent noise components $B_{30}$, $B_{31}$, $B_{32}$, $B_{33}$, $B_{34}$, $B_{35}$, $B_{36}$ and $B_{37}$ (see FIG. 3(c)), which vary with a period designated as "period 3," are superimposed. Specifically, if the respective cumulative data $B_k$ (actually measured values) are expressed with the coherent noise components taken into account, then $B_k = B_{1k} + B_{2k} + B_{3k}$.

As was described above, Equation (9) is used in the present embodiment. This Equation (9) is a calculation formula for the initial phase difference $\phi_0$ which is derived from Equation (4) like Equation (8a) of the above-mentioned 4-bucket method. Accordingly, if it is assumed that no coherent noise components are generated, Equation (9) is equivalent to Equation (8a).

Here, in regard to the required signal components $B_{10}$, $B_{11}$, $B_{12}$, $B_{13}$, $B_{14}$, $B_{15}$, $B_{16}$ and $B_{17}$, as is also clear from Equation (4) and FIG. 3(a), the relationships $B_{10}=B_{14}$, $B_{11}=B_{15}$, $B_{12}=B_{16}$ and $B_{13}=B_{17}$ are established as a result of the periodic properties of these components. Furthermore, in regard to the coherent noise components $B_{20}$, $B_{21}$, $B_{22}$, $B_{23}$, $B_{24}$, $B_{25}$, $B_{26}$ and $B_{27}$, the relationship $B_{20}+B_{24}=B_{21}+B_{25}=B_{22}+B_{26}=B_{23}+B_{27}=B_{v1}$ is established (see FIG. 3(b)), and in regard to the coherent noise components $B_{30}$, $B_{31}$, $B_{32}$, $B_{33}$, $B_{34}$, $B_{35}$, $B_{36}$ and $B_{37}$, the relationship $B_{30}+B_{34}=B_{31}+B_{35}=B_{32}+B_{36}=B_{33}+B_{37}=B_{v3}$ is established (see FIG. 3(c)).

In this case, if the cumulative data $B_0$, $B_1$, $B_2$, $B_3$, $B_4$, $B_5$, $B_6$ and $B_7$ (actually measured values) are substituted into the right side of Equation (9), the terms corresponding to the coherent noise components ($B_{20}$, $B_{21}$, $B_{22}$, $B_{23}$, $B_{24}$, $B_{25}$, $B_{26}$, $B_{27}$, $B_{30}$, $B_{31}$, $B_{32}$, $B_{33}$, $B_{34}$, $B_{35}$, $B_{36}$ and $B_{37}$) are all cancelled, as is clear from Equation (10) below.

$$\tan^{-1}\left(\frac{(B_0+B_4)-(B_2+B_6)}{(B_1+B_5)-(B_3+B_7)}\right) = \tan^{-1}\left(\frac{\{(B_{10}+B_{20}+B_{30})+(B_{14}+B_{24}+B_{34})\}-\{(B_{12}+B_{22}+B_{32})+(B_{16}+B_{26}+B_{36})\}}{\{(B_{11}+B_{21}+B_{31})+(B_{15}+B_{25}+B_{35})\}-\{(B_{13}+B_{23}+B_{33})+(B_{17}+B_{27}+B_{37})\}}\right) \quad (10)$$

$$= \tan^{-1}\left(\frac{(2B_{10}+B_{v1}+B_{v3})-(2B_{12}+B_{v1}+B_{v3})}{(2B_{11}+B_{v1}+B_{v3})-(2B_{13}+B_{v1}+B_{v3})}\right)$$

$$= \tan^{-1}\left(\frac{2B_{10}-2B_{12}}{2B_{11}-2B_{13}}\right)$$

$$= \tan^{-1}\left(\frac{B_{10}-B_{12}}{B_{11}-B_{13}}\right)$$

$\because B_k = B_{1k} + B_{2k} + B_{3k}$, $B_{10} = B_{14}, B_{11} = B_{15}, B_{12} = B_{16}, B_{13} = B_{17}$, $B_{20} + B_{24} = B_{21} + B_{25} = B_{22} + B_{26} = B_{23} + B_{27} = B_{v1}$, $B_{30} + B_{34} = B_{31} + B_{35} = B_{32} + B_{36} = B_{33} + B_{37} = B_{v3}$ Specifically, in the case of Equation (9), unlike the case of Equation (8a) of the 4-bucket method, the cumulative data on which the calculation is to be based increase by an amount equal to two periods (of the required signal components $B_{1k}$); accordingly, as a result of the periodic characteristics of the respective components, the coherent noise components $B_{2k}$ and $B_{3k}$ are eliminated, so that only the required signal components $B_{1k}$ remain.

Consequently, if Equation (9) of the present embodiment is used, the initial phase difference $\phi_0$ can be determined without being affected by the coherent noise components $B_{2k}$ or $B_{3k}$, regardless of the intensity at which these components are superimposed on the cumulative data $B_k$ (actually measured values).

Next, for purposes of comparison with the present embodiment described above, the behavior of the coherent noise components in a convention interference measuring apparatus 70 will be described with reference to Table 2 and FIG. 4.

TABLE 2

Table comparing differences in the light paths of the respective light components and the amounts of variation in the light path differences in a conventional example.

| Name of light component (reflection path, amount of variation in light path) | | Detected light 72a (W, 0) | | Reference light 73a (R, 1) | |
|---|---|---|---|---|---|
| Detected light 72a (W, 0) | | | | | |
| Reference light 73a (R, 1) | M | W − R, | −1 | | |
| Noise light b (N, 0) | 111 | W − N, | 0 | 121 R − N, | 1 |
| Noise light c (WNW, 0) | 112 | −W + N, | 0 | 122 R − 2W − N, | 1 |
| Noise light d (WNR, 1) | 113 | −R + N, | −1 | 123 −W − N, | 0 |

TABLE 2-continued

Table comparing differences in the light paths of the respective
light components and the amounts of variation in the light path
differences in a conventional example.

| Name of light component (reflection path, amount of variation in light path) | | Detected light 72a (W, 0) | | Reference light 73a (R, 1) | |
|---|---|---|---|---|---|
| Noise light e (RNR, 2) | 114 | W − 2R − N, | −2 | 124 −R − N, | −1 |
| Noise light f (RNW, 1) | 115 | −R − N, | −1 | 125 −W − N, | 0 |

(Amount of variation in light path of reference light used as a standard)

In the case of a conventional interference measuring apparatus 70, as was described above, there is no movement of the detected surface 72; accordingly, the amount of variation in the light path of the detected light 72a is "0" when the amount of variation in the light path of the reference light 73a is "1." Consequently, the respective amounts of variation in the light paths of the noise light components b, c, d, e and f are "0," "0," "1," "2" and "1."

Furthermore, the required signal component $S_M'$ (i.e., the interference light formed by the reference light 73a and detected light 72a) varies with a period designated as "period 1" (see table cell M).

Moreover, the coherent noise components $S_{111}'$ and $S_{112}'$ respectively generated by the interference of the noise light components b and c with the detected light 72a and the coherent noise components $S_{123}'$ and $S_{125}'$ respectively generated by the interference of the noise light components d and f with the reference light 73a all vary with a period designated as "period 0" (i.e., these components are steady) (see table cells 111, 112, 123 and 125).

Likewise, the coherent noise components $S_{113}'$ and $S_{115}'$ respectively generated by the interference of the noise light components d and f with the detected light 72a and the coherent noise components $S_{121}'$, $S_{122}'$ and $S_{124}'$ respectively generated by the interference of the noise light components b, c and e with the reference light 73a all vary with a period designated as "period 1" (see table cells 113, 115, 121, 122 and 124).

Furthermore, the coherent noise component $S_{114}'$ generated by the interference of the noise light component e with the detected light 72a varies with a period designated as "period 2" (see table cell 114).

Specifically, in the conventional example, the periods of variation in the intensities of some of the coherent noise components, i.e., $S_{113}'$, $S_{115}'$, $S_{121}'$, $S_{122}'$ and $S_{124}'$, are the same as the period of variation in the intensity of the required signal component $S_M'$.

Figure 4:
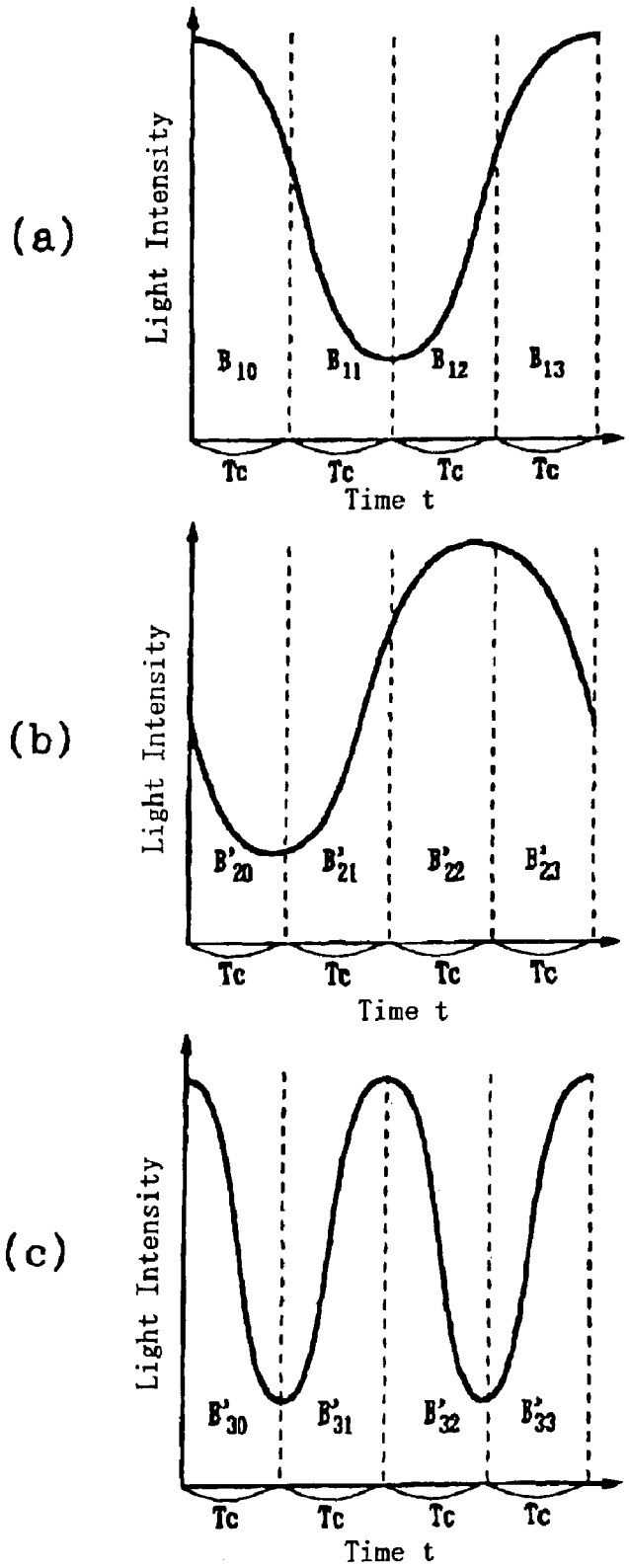
FIG. 4 is a diagram which compares the variation of the respective coherent noise components and the variation of the required signal components in a conventional example.

Accordingly, in the cumulative data $B_0$, $B_1$, $B_2$ and $B_3$ (actually measured values) that are output from the conventional imaging element 76, as is shown in FIG. 4, it appears that the required signal components $B_{10}'$, $B_{11}'$, $B_{12}'$ and $B_{13}'$ that vary with a period designated as "period 1" (see FIG. 4(a)), coherent noise components $B_{20}'$, $B_{21}'$, $B_{22}'$ and $B_{23}'$ that vary with a period designated as "period 1" (see FIG. 4(b)) and coherent noise components $B_{30}'$, $B_{31}'$, $B_{32}'$ and $B_{33}'$ that vary with a period designated as "period 2" (see FIG. 4(c)) are superimposed. Specifically, if the respective cumulative data $B_k$ (actually measured values) are expressed with the coherent noise components taken into account, then $B_k = B_{1k}' + B_{2k}' + B_{3k}'$.

Furthermore, in the case of (for example) Equation (8a), which has been used in conventional techniques, since cumulative data that are shifted by two places are subtracted from each other, there is no effect from the coherent noise components $B_{30}'$, $B_{31}'$, $B_{32}'$ or $B_{33}'$, which vary with a period designated as "period 2," due to the fact that the relationships $B_{30}' = B_{32}'$ and $B_{31}' = B_{33}'$ are established; however, there is an effect from the coherent noise components $B_{20}'$, $B_{21}'$, $B_{22}'$ and $B_{23}'$, which vary with the same "period 1" as the required signal components $B_{10}'$, $B_{11}'$, $B_{12}'$ and $B_{13}'$.

Furthermore, even assuming that a different equation is used, since signals that vary with the same period as each other cannot be separated, these coherent noise components $B_{2k}'$ cannot be eliminated.

In this respect, in the present embodiment described above, the periods of variation in the intensities of the coherent noise components and the periods of variation in the intensities of the required signal components are caused to differ by respectively moving the detected surface 72 and reference surface 73 while maintaining the ratio of the amounts of movement at 1:−1, and Equation (9) is applied, so that the effects of such coherent noise components can be securely eliminated. As a result, the precision with which the shape of the detected surface 72 is measured can be increased.

<Second Embodiment>

Next, a second embodiment of the present invention will be described with reference to FIGS. 1 and 5. Here, only the points that differ from the first embodiment will be described.

(Construction of Second Embodiment)

The interference measuring apparatus 20 of the present embodiment is equivalent to an interference measuring apparatus in which a control circuit 28 is provided instead of the control circuit 18 in the interference measuring apparatus 10 shown in FIG. 1.

Like the control circuit 18, the control circuit 28 applies driving voltages in specified patterns to the respective moving mechanisms 77 and 17 during the fringe scan, thus causing the reference surface 73 and detected surface 72 to move in respective specified patterns. Furthermore, the control circuit 28 drives the imaging element 76, and sends the cumulative data $B_0$, $B_1$, $B_2$, . . . output by the imaging element 76 in this case to the calculating circuit 19. However, the movement patterns of the reference surface 73 and detected surface 72 are different from those created by the control circuit 19.

(Operation of Second Embodiment)

In the second embodiment, the ratio of the amount of movement of the detected surface 72 to the amount of movement of the reference surface 73 is maintained at 3:1 during the fringe scan.

Specifically, during a period of 8 $T_c$, the control circuit 28 varies the driving voltage that is applied to the moving mechanism 77 in accordance with time so that the reference surface 73 is uniformly moved by an amount equal to ½ wavelength; at the same time, the control circuit 28 varies the driving voltage that is applied to the moving mechanism 17 in accordance with time so that the detected surface 72 is moved by an amount equal to 3/2 wavelength (furthermore, the positive/negative difference in the amounts of movement corresponds to the difference in the direction of light path contraction/direction of light path expansion; however, either of these directions may be taken as positive).

As a result of this fringe scan, the cumulative data $B_0$, $B_1$, $B_2$, $B_3$, $B_4$, $B_5$, $B_6$ and $B_7$ (actually measured values) are successively obtained (see FIG. 2(b)). Like the respective cumulative data obtained in the first embodiment, these respective cumulative data each correspond to ¼ of the period of the respective required signal components, so that these cumulative data overall correspond to data equal to a period that is twice the period of the required signal components.

Furthermore, when the calculating circuit 19 calculates the initial phase difference $\phi_0$, the same Equation (9) as in the first embodiment is used (see FIG. 2(c)).

(Behavior of Coherent Noise Components in the Second Embodiment)

Here, as in the first embodiment, the light components associated with the coherent noise components in the interference measuring apparatus 20 consist of the noise light b (N), noise light c (WNW), noise light d (WNR), noise light e (RNR) and noise light f (RNW).

Furthermore, the alphabetic characters shown in parentheses indicate the reflection light paths. Specifically, the reflection path of the detected surface 72 is indicated by W, the reflection path of the reference light 73 is indicated by R, and the reflection path of any location inside the interferometer 75 is indicated by N. Furthermore, since the reflectivity at any location inside the interferometer 75 is sufficiently lower than the reflectivity of the detected surface 72 or reference surface 73, noise light that is reflected two or more times at such locations can be ignored.

Next, the period of variation in the intensity of the required signal components and the period of variation in the intensity of the respective coherent noise components will be compared on the basis of Table 3.

Table 3 is a table that compares the differences in the light paths of the respective light components, and the amounts of variation in the light path differences, in the present embodiment.

TABLE 3

Table comparing differences in the light paths of the respective light components and the amounts of variation in the light path differences in the second embodiment.

| Name of light component (relection path, amount of variation in light path) | | Detected light 72a (W, 3) | | Reference light 73a (R, 1) | |
|---|---|---|---|---|---|
| Detected light 72a (W, 3) | | | | | |
| Reference light 73a (R, 1) | M | W − R, | 2 | | |
| Noise light b (N, 0) | 111 | W − N, | 3 | 121 R − N, | 1 |
| Noise light c (WNW, 6) | 112 | −W + N, | −3 | 122 R − 2W − N, | −5 |
| Noise light d (WNR, 4) | 113 | −R + N, | −1 | 123 W − N, | −3 |
| Noise light e (RNR, 2) | 114 | W − 2R − N, | 1 | 124 −R − N, | −1 |
| Noise light f (RNW, 4) | 115 | −R − N, | −1 | 125 −W − N, | −3 |

(Amount of variation in light path of reference light used as a standard)

In the present embodiment, as was described above, the amount of variation in the light path of the detected light 72a is "3" when the amount of variation in the light path of the reference light 73a is "1." Accordingly, the respective amounts of variation in the light paths of the noise light components b, c, d, e and f are "0," "6," "4," "2" and "4."

The required signal component $S_M''$ formed by the reference light 73a and detected light 72a in this case varies with a period designated as "period 2" (see table cell M).

Similarly, the coherent noise component $S_{111}''$ generated by the interference of the noise light b with the detected light 72a varies with a period designated as "period 3" (see table cell 111).

Furthermore, the coherent noise component $S_{112}''$ generated by the interference of the noise light c with the detected light 72a varies with a period designated as "period 3" (see table cell 112).

Furthermore, the coherent noise component $S_{113}''$ generated by the interference of the noise light d with the detected light 72a varies with a period designated as "period 1" (see table cell 113).

Furthermore, the coherent noise component $S_{114}''$ generated by the interference of the noise light e with the detected light 72a varies with a period designated as "period 1" (see table cell 114).

Furthermore, the coherent noise component $S_{115}''$ generated by the interference of the noise light f with the detected light 72a varies with a period designated as "period 1" (see table cell 115).

Furthermore, the coherent noise component $S_{121}''$ generated by the interference of the noise light b with the reference light 73a varies with a period designated as "period 1" (see table cell 121).

Furthermore, the coherent noise component $S_{122}''$ generated by the interference of the noise light c with the reference light 73a varies with a period designated as "period 5" (see table cell 122).

Furthermore, the coherent noise component $S_{123}''$ generated by the interference of the noise light d with the reference light 73a varies with a period designated as "period 3" (see table cell 123).

Furthermore, the coherent noise component $S_{124}''$ generated by the interference of the noise light e with the reference light 73a varies with a period designated as "period 1" (see table cell 124).

Furthermore, the coherent noise component $S_{125}''$ generated by the interference of the noise light f with the reference light 73a varies with a period designated as "period 3" (see table cell 125).

Specifically, in the present embodiment as well, the periods of variation in the intensities of the respective coherent noise components $S_{111}''$ through $S_{125}''$ all differ from the period of variation in the intensity of the required signal component $S_M''$.

Figure 5:
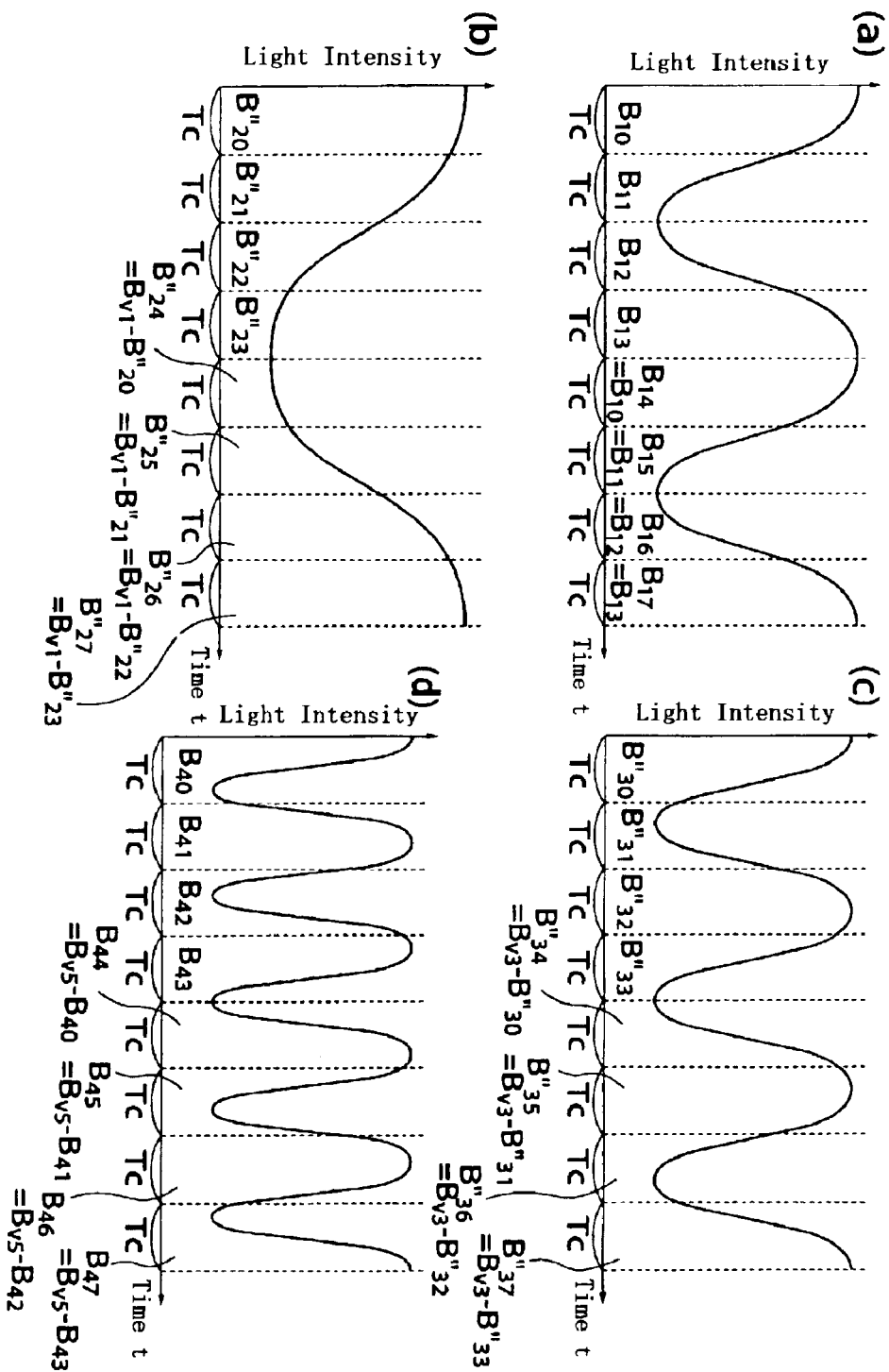
FIG. 5 is a diagram which compares the variation of the respective coherent noise components and the variation of the required signal components in the second embodiment.

FIG. 5 is a diagram which compares the variations of the respective coherent noise components $S_{111}''$ through $S_{125}''$ and the variation of the required signal component $S_M''$ in the present embodiment. FIG. 5(a) shows a signal that varies with a period designated as "period 2" in the same manner as the required signal component $S_M''$, while FIG. 5(b) shows a signal that varies with a period designated as "period 1," as in the case of the coherent noise components $S_{113}''$, $S_{114}''$, $S_{115}''$, $S_{121}''$ and $S_{124}''$, FIG. 5(c) shows a signal that varies with a period designated as "period 3," as in the case of the coherent noise components $S_{111}''$, $S_{112}''$, $S_{123}''$ and $S_{125}''$, and FIG. 5(d) shows a signal that varies with a period designated as "period 5," as in the case of the coherent noise component $S_{122}''$ (however, neither the amplitudes nor phases shown in FIG. 3 have meaning).

Accordingly, in the cumulative data $B_0$, $B_1$, $B_2$, $B_3$, $B_4$, $B_5$, $B_6$ and $B_7$ (actually measured values) that are output from the imaging element 76 during the above-mentioned fringe scan, it appears that the required signal components $B_{10}$, $B_{11}$, $B_{12}$, $B_{13}$, $B_{14}$, $B_{15}$, $B_{16}$ and $B_{17}$ (see FIG. 5(a)), which vary with a period designated as "period 2," the coherent noise components $B_{20}''$, with a period designated as "period 1," the coherent noise components $B_{30}''$, $B_{31}''$, $B_{32}''$, $B_{33}''$, $B_{34}''$, $B_{35}''$, $B_{36}''$ and $B_{37}''$ (see FIG. 5(c)), which vary with a period designated as "period 3," and the coherent noise components $B_{40}$, $B_{41}$, $B_{42}$, $B_{43}$, $B_{44}$, $B_{45}$, $B_{46}$ and $B_{47}$ (see FIG. 5(d)), which vary with a period designated as "period 5," are superimposed. Specifically, if the respective cumulative data $B_k$ (actually measured values) are expressed with the coherent noise components taken into account, then $B_k = B_{1k} + B_{2k}'' + B_{3k}'' + B_{4k}$ In the present embodiment, as was described above, Equation (9) is used. This Equation (9) is the same as that used in the above-mentioned first embodiment. Specifically, this is a formula for calculating the initial phase difference $\phi_0$ which is equivalent to Equation (8a) if it is assumed that no coherent noise components are generated.

Here, in the case of the required signal components $B_{10}$, $B_{11}$, $B_{12}$, $B_{13}$, $B_{14}$, $B_{15}$, $B_{16}$ and $B_{17}$ the relationships $B_{10} = B_{14}$, $B_{11} = B_{15}$, $B_{12} = B_{16}$ and $B_{13} = B_{17}$ are established from the variation periods of these components (see FIG. 5(a)). Furthermore, in the case of the coherent noise components $B_{20}''$, $B_{21}''$, $B_{22}''$, $B_{23}''$, $B_{24}''$, $B_{25}''$, $B_{26}''$ and $B_{27}''$, the relationship $B_{20}'' + B_{24}'' = B_{21}'' + B_{25}'' = B_{22}'' + B_{26}'' = B_{23}'' + B_{27}'' = B_{v1}$ is established (see FIG. 5(b)). Moreover, in the case of the coherent noise components $B_{30}''$, $B_{31}''$, $B_{32}''$, $B_{33}''$, $B_{34}''$, $B_{35}''$, $B_{36}''$ and $B_{37}''$, the relationship $B_{30}'' + B_{34}'' = B_{31}'' + B_{35}'' = B_{32}'' + B_{36}'' = B_{33}'' + B_{37}'' = B_{v3}$ is established (see FIG. 5(c)), and in the case of the coherent noise components $B_{40}$, $B_{41}$, $B_{42}$, $B_{43}$, $B_{44}$, $B_{45}$, $B_{46}$ and $B_{47}$, the relationship $B_{40} + B_{44} = B_{41} + B_{45} = B_{42} + B_{46} = B_{43} + B_{47} = B_{v5}$ is established (see FIG. 5(d)).

In this case, if the cumulative data $B_0$, $B_1$, $B_2$, $B_3$, $B_4$, $B_5$, $B_6$ and $B_7$ (actually measured values) are substituted into the right side of Equation (9), the terms corresponding to the coherent noise components ($B_{20}''$, $B_{21}''$, $B_{22}''$, $B_{23}''$, $B_{24}''$, $B_{25}''$, $B_{26}''$, $B_{27}''$, $B_{30}''$, $B_{31}''$, $B_{32}''$, $B_{33}''$, $B_{34}''$, $B_{35}''$, $B_{36}''$, $B_{37}''$, $B_{40}$, $B_{41}$, $B_{42}$, $B_{43}$, $B_{44}$, $B_{45}$, $B_{46}$ and $B_{47}$) are all cancelled, as is clear from Equation (11) below.

$$\tan^{-1}\left(\frac{(B_0 + B_4) - (B_2 + B_6)}{(B_1 + B_5) - (B_3 + B_7)}\right) = \tan^{-1}\left(\frac{\{(B_{10} + B_{20}'' + B_{30}'' + B_{40}) + (B_{14} + B_{24}'' + B_{34}'' + B_{44})\} - \{(B_{12} + B_{22}'' + B_{32}'' + B_{42}) + (B_{16} + B_{26}'' + B_{36}'' + B_{46})\}}{\{(B_{11} + B_{21}'' + B_{31}'' + B_{41}) + (B_{15} + B_{25}'' + B_{35}'' + B_{45})\} - \{(B_{13} + B_{23}'' + B_{33}'' + B_{43}) + (B_{17} + B_{27}'' + B_{37}'' + B_{47})\}}\right) \quad (11)$$

$$= \tan^{-1}\left(\frac{(2B_{10} + B_{v1} + B_{v3} + B_{v5}) - (2B_{12} + B_{v1} + B_{v3} + B_{v5})}{(2B_{11} + B_{v1} + B_{v3} + B_{v5}) - (2B_{13} + B_{v1} + B_{v3} + B_{v5})}\right)$$

$$= \tan^{-1}\left(\frac{2B_{10} - 2B_{12}}{2B_{11} - 2B_{13}}\right)$$

$$= \tan^{-1}\left(\frac{B_{10} - B_{12}}{B_{11} - B_{13}}\right)$$

$\because B_k = B_{1k} + B_{2k}'' + B_{3k}'' + B_{4k}$, $B_{10} = B_{14}, B_{11} = B_{15}, B_{12} = B_{16}, B_{13} = B_{17}$, $B_{20}'' + B_{24}'' = B_{21}'' + B_{25}'' = B_{22}'' + B_{26}'' = B_{23}'' + B_{27}'' = B_{v1}$, $B_{30}'' + B_{34}'' = B_{31}'' + B_{35}'' = B_{32}'' + B_{36}'' = B_{33}'' + B_{37}'' = B_{v3}$, $B_{40} + B_{44} = B_{41} + B_{45} = B_{42} + B_{46} = B_{43} + B_{47} = B_{v5}$ Specifically, in the case of Equation (9), unlike the case of Equation (8a) of the 4-bucket method, the cumulative data on which the calculation is to be based increase by an amount equal to two periods (of the required signal components $B_{1k}$); accordingly, as a result of the periodic characteristics of the respective components, the coherent noise components $B_{2k}''$, $B_{3k}''$ and $B_{4k}$ are eliminated, so that only the required signal components $B_{1k}$ remain.

Consequently, if Equation (9) of the present embodiment is used, the initial phase difference $\phi_0$ can be determined without being affected by the coherent noise components $B_{2k}''$, $B_{3k}''$ or $B_{4k}$, regardless of the intensity at which these components are superimposed on the cumulative data $B_k$ (actually measured values).

In the present embodiment, as was described above, the periods of variation in the intensities of the coherent noise components and the periods of variation in the intensities of the required signal components are caused to differ by respectively moving the detected surface 72 and reference surface 73 while maintaining the ratio of the amounts of movement at 3:1, and Equation (9) is applied, so that the effects of such coherent noise components can be securely eliminated. As a result, the precision with which the shape of the detected surface 72 is measured can be increased.

Furthermore, in the present embodiment, it would also be possible to change the ratio of the amounts of movement of the detected surface 72 and reference surface 73 to 1:3. In this case, as in the case in which the ratio was set at 3:1, the precision with which the shape of the detected surface 72 is measured can be increased.

<Third Embodiment>

Next, a third embodiment of the present invention will be described with reference to FIGS. 2 and 6. Here, only the points that differ from the first and second embodiments will be described.

(Construction of Third Embodiment)

Figure 6:
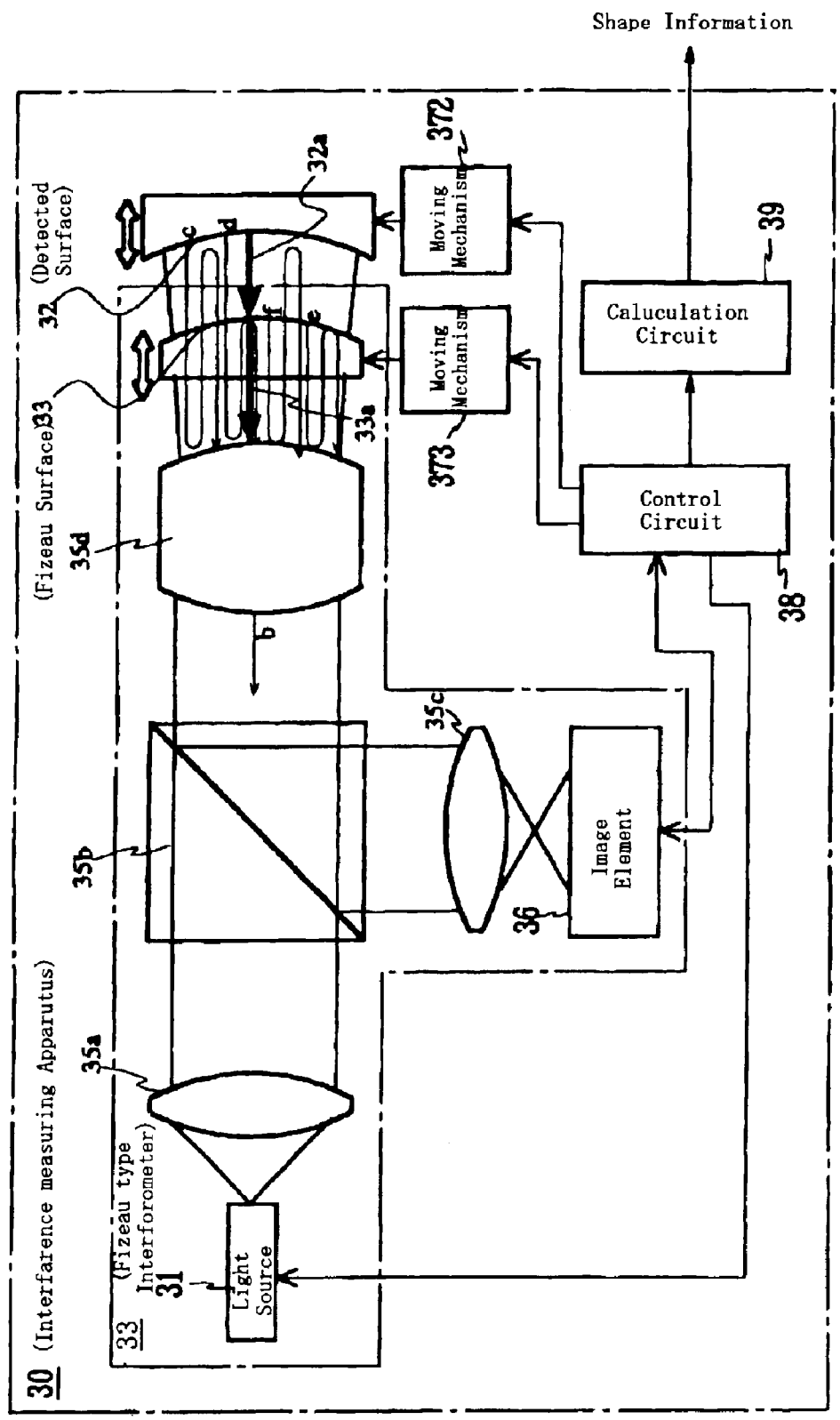
FIG. 6 is a structural diagram of the interference measuring apparatus in the third embodiment.

FIG. 6 is a structural diagram of the interference measuring apparatus 30 of the present embodiment.

The interference measuring apparatus 30 differs from the interference measuring apparatuses 10 and 20 of the above-mentioned first and second embodiments (furthermore, the interferometer 75 is a Michaelson type interferometer) in that a Fizeau type interferometer 35 is used.

The Fizeau type interferometer 35 has a light source 31, a beam expander 35a, a beam splitter 35b, a null lens 35d, an image-focusing lens 35c and an imaging element 36, etc.

In this Fizeau type interferometer 35, light emitted from the light source 31 is incident on the null lens 35d via the beam expander 35a and beam splitter 35b.

The light beam that is incident on the null lens 35d strikes a Fizeau surface 33 (the reference surface of the Fizeau type interferometer) disposed in a specified position.

One portion of the light beam that is incident on the Fizeau surface 33 is reflected by the Fizeau surface 33 to form reference light 33a, while another portion of this light passes through the Fizeau surface, and is then reflected by the detected surface 32 disposed in a specified position, so that this light forms detected light 32a.

The reference light 33a is incident on the imaging element 36 after passing through the null lens 35d, beam splitter 35b and image-focusing lens 35c, while the detected light 32a is incident on the imaging element 36 after passing through the Fizeau surface 33, null lens 35d, beam splitter 35b and image-focusing lens 35c. Furthermore, the reference light 33a and detected light 32b interfere with each other, so that interference fringes are formed on the imaging element 36.

The difference between this Fizeau type interferometer 35 and a Michaelson type interferometer (symbol 75 in FIG. 1) is that the light path of the reference light 33a and the light path of the detected light 32a are shared in the Fizeau interferometer 35 (although the light path lengths are different). As a result, the Fizeau type interferometer 35 can more or less match the environment of the light path of the reference light 33a and the environment of the light path of the detected light 32a, so that this interferometer is suitable for use in measurements in which an especially high degree of precision is required.

Furthermore, the interference measuring apparatus 30 equipped with this Fizeau type interferometer 35 is equipped with two moving mechanisms, i.e., a moving mechanism 372 and a moving mechanism 373, a control circuit 38, and a calculating circuit 39.

The moving mechanism 372 moves the detected surface 32 in the direction of the optical axis by a distance corresponding to the driving voltage that is applied, in order to vary the optical distance of the light path of the detected light 32a. The moving mechanism 373 moves the reference surface 33 in the direction of the optical axis by a distance corresponding to the driving voltage that is applied, in order to vary the optical distance of the light path of the reference light 33a. For example, these moving mechanisms 372 and 373 consist of piezo-electric elements. In the present embodiment, elements that have the same characteristics are used.

The imaging element 36 consists of a CCD type imaging element, etc. When this imaging element 36 is driven by the control circuit 38, the imaging element 36 accumulates a charge corresponding to the intensity of the incident light in each pixel for each unit time $T_c$, and successively outputs cumulative data $B_0$, $B_1$, $B_2$, . . . (actually measured values) which are signals indicating the time-integrated values of the incident light intensity over the time $T_c$.

The control circuit 38 applies driving voltages to the respective moving mechanisms 373 and 372 in specified patterns during the fringe scan, so that the reference surface 33 and detected surface 32 are respectively moved in specified patterns. Furthermore, the control circuit 38 drives the imaging element 36 in this case, and sends the cumulative data $B_0$, $B_1$, $B_2$, . . . (actually measured values) that are output by the imaging element 36 to the calculating circuit 39.

The calculating circuit 39 performs specified mathematical operations on the cumulative data $B_0$, $B_1$, $B_2$, . . . (actually measured values) when the calculating circuit 39 determines the phase difference (e.g., the initial phase difference $\phi_0$) between the reference light 33a and detected light 32a in a specified state (e.g., the initial state at the time that the fringe scan is initiated). Furthermore, this calculating circuit 39 may also be installed outside the interference measuring apparatus 30. Moreover, it would also be possible to utilize a computer that performs the same operations as the calculating circuit 39 instead of this calculating circuit 39.

(Operation of Third Embodiment)

In the present embodiment, as in the first embodiment, the difference in the optical distances of the detected light 32a and reference light 33a is varied by an amount that is equal to at least two wavelengths of the light emitted from the light source 31 (two periods in terms of the phase difference) while the ratio of the amount of movement of the detected surface 32 to the amount of movement of the Fizeau surface 33 (reference surface) is maintained at 1:−1 during the fringe scan (see FIG. 2(a)). Furthermore, the system is set so that the position of the Fizeau surface 33 (reference surface) and the position of the detected surface 32 both vary linearly with a sufficient degree of precision with respect to time, and so that the amount of variation $2\pi a$ in the phase difference between the detected light 32a and reference light 33a per unit time $T_c$ is $\pi/2$ (i.e., so that a=¼) (see FIG. 2(a)).

Specifically, during a period of $8\,T_c$, the control circuit 38 (like the control circuit 18) varies the driving voltage applied to the moving mechanism 373 in accordance with time so that the Fizeau surface 33 (reference surface) is moved uniformly by an amount equal to ½ wavelength, and at the same time, the control circuit 38 varies the driving voltage applied to the moving mechanism 372 in accordance with time so that the detected surface 32 is moved uniformly by an amount equal to −½ wavelength. (Furthermore, the positive/negative difference in the amounts of movement corresponds to the difference in the direction of light path contraction/direction of light path expansion; however, either direction may be taken as positive).

As a result of this fringe scan, the cumulative data $B_0$, $B_1$, $B_2$, $B_3$, $B_4$, $B_5$, $B_6$ and $B_7$ (actually measured values) are obtained (see FIG. 2(b)).

Furthermore, in determining the initial phase difference $\phi_0$, the calculating circuit 39 applies the above-mentioned Equation (9) to the above-mentioned cumulative data $B_0$, $B_1$, $B_2$, $B_3$, $B_4$, $B_5$, $B_6$ and $B_7$ (actually measured values) equal to two periods (see FIG. 2(c)).

(Behavior of Coherent Noise Components in the Third Embodiment)

Here, the Fizeau type interferometer 35 shown in FIG. 6 and the interferometer 75 (Michaelson type interferometer) shown in FIGS. 1 and 7 differ only in terms of whether or not the light paths are partially overlapped as described above. Accordingly, the types of noise light associated with the coherent noise components in the interference measuring apparatus 30 are the same as the types of noise light in the interference measuring apparatuses 10, 20 and 70.

Specifically, as is shown by the fine lines in FIG. 6, these types of noise light consist of noise light which is a portion of the light emitted from the light source 31 and which is reflected from some location other than the required reflecting surface inside the Fizeau type interferometer 35, so that this light interferes with the detected light 32a or reference light 33a without passing by way of the detected surface 32 or Fizeau surface 33 (noise light b (N)), and noise light which is a portion of the light reflected from the detected surface 32 or Fizeau surface 33, and which interferes with the detected light 32a or reference light 33a after being reflected by the emission port of the light source 31 or some other surface of the optical system, etc., inside the Fizeau type interferometer 35, thus again being directed toward the detected surface 32 or Fizeau surface 33, and then being reflected by the detected surface 32 or Fizeau surface 33 (noise light c (WNW), noise light d (WNR), noise light e (RNR) and noise light f (RNW)).

Furthermore, the alphabetic characters shown in parentheses indicate the reflection paths. Specifically, the reflection path of the detected surface 32 is indicated by W, the reflection path of the Fizeau surface 33 is indicated by R, and the reflection path of any location inside the Fizeau type interferometer 35 is indicated by N. Furthermore, since the reflectivity at any location inside the Fizeau type interferometer 35 is sufficiently lower than the reflectivity of the detected surface 32 or Fizeau surface 33, noise light that is reflected two or more times at such locations can be ignored.

Furthermore, in the present embodiment, in which the detected surface 32 and Fizeau surface 33 (reference surface) are moved in the same patterns as in the first embodiment, the differences in the light paths of the respective light components, and the amount of variation in these light path differences, are the same as in the first embodiment, and are as shown in Table 1.

Specifically, in the present embodiment as well, the same differences as those in the first embodiment are created between the periods of variation in the intensities of the respective coherent noise components $S_{111}$ through $S_{125}$ and the period of variation in the intensity of the required signal component $S_M$.

As a result, for the same reasons as those described in the above-mentioned first embodiment, the initial phase difference $\phi_0$ can be determined by Equation (9) without being affected by the coherent noise components.

In the present embodiment, as was described above, the detected surface 32 and Fizeau surface 33 (reference surface) are moved in the same patterns as in the first embodiment in an interference measuring apparatus 30 using a Fizeau type interferometer 35; furthermore Equation (9) is applied. Accordingly, the effects of the coherent noise components can be securely eliminated. As a result, the degree of precision with which the shape of the detected surface 32 is measured can be increased.

Furthermore, in the present embodiment, the ratio of the amounts of movement of the detected surface 32 and Fizeau surface 33 (reference surface) may also be changed to 3:1 or 1:3, as in the second embodiment. In this case as well, the degree of precision with which shape measurement is performed can be increased for the same reasons as those described in the above-mentioned second embodiment.

Other

In the respective embodiments described above, if the coherent noise components vary with an integral period (but with a period that differs from that of the required signal components) during the variation of the required signal components with an even-numbered period, then the detected surface 72 or 32 and reference surface 73 or 33 can be moved in any pattern. If movement patterns that realize such a period relationship are used, then the effects of coherent noise components can be securely removed by the above-mentioned Equation (9). However, it is desirable from the standpoint of suppressing the total of the movement distances of these surfaces to a small value that the ratio of the movement amounts of the detected surface 72 or 32 and reference surface 73 (Fizeau surface 33) be set at 1:−1. Next most desirable is a movement amount ratio of 3:1 or 1:3. As a result, an increase in the size of the interferometer can be prevented.

Furthermore, in the respective embodiments described above, the number of cumulative data acquired may be set at 9 instead of 8 (i.e., the fringe scan may be performed for at least (2+¼) periods in terms of the phase difference), and Equation (12) may be used instead of Equation (9). Like Equation (8b) of the above-mentioned 5-bucket method, this Equation (12) is a calculation formula for the initial phase difference $\phi_0$ which is derived from Equation (4). Accordingly, Equation (12) is equivalent to Equation (8b) if it is assumed that no coherent noise components are generated.

$$\phi_0 = \tan^{-1}\left(\frac{\left(\frac{B_0+B_4}{2}+\frac{B_4+B_8}{2}\right)-(B_2+B_6)}{(B_1+B_5)-(B_3+B_7)}\right) \quad (12)$$

If the cumulative data $B_0$, $B_1$, $B_2$, $B_3$, $B_4$, $B_5$, $B_6$, $B_7$ and $B_8$ (actually measured values) on which the coherent noise components are superimposed as described in the respective embodiments described above are substituted into the right side of this Equation (12), then the terms corresponding to the coherent noise components are all canceled as shown in the following Equation (13).

$$\tan^{-1}\left(\frac{\left(\frac{B_0+B_4}{2}+\frac{B_4+B_8}{2}\right)-(B_2+B_6)}{(B_1+B_5)-(B_3+B_7)}\right) = \tan^{-1}\left(\frac{\frac{B_{10}+B_{14}}{2}-B_{12}}{B_{11}-B_{13}}\right) \quad (13)$$

Specifically, Equation (12) differs from Equation (8b) of the 5-bucket method in that the cumulative data on which the calculations are to be based increase in an amount equal to two periods (of the required signal components); accordingly, as a result of the periodic characteristics of the respective components, the coherent noise components are eliminated, so that only the required signal components remain.

Consequently, if Equation (12) applied in the respective embodiments described above is used, the initial phase difference $\phi_0$ can be determined without being affected by the coherent noise components, regardless of the intensity at which these components are superimposed on the cumulative data $B_k$ (actually measured values).

Furthermore, in the respective embodiments described above, a calculation formula based on any number of cumulative data may be used, as long as the coherent noise components can be eliminated.

Moreover, in the respective embodiments described above, any movement patterns and any calculation formulae may be combined, as long as the reference surface and detected surface can be moved in patterns that create a difference in period between the required signal components and the coherent noise components, and as long as the required signal components and coherent noise components can be separated or cancelled.

Furthermore, when the detected surface and reference surface are respectively moved, it is necessary that these movements be performed while controlling the timing of the initiation of the respective movements of the detected surface and reference surface and the difference in the movement speeds. For this purpose, for example, moving mechanisms are required which drive the detected surface and reference surface in the direction of the optical axis while synchronizing the respective surfaces. Furthermore, the reason that the detected surface and reference surface are respectively moved is to vary the light path lengths of the light rays passing by way of the detected surface and the light rays passing by way of the reference surface. In the present invention, the means used to cause synchronous variation of the respective light path lengths are not limited to moving mechanisms that drive the detected surface and reference surface in the direction of the optical axis.

Furthermore, the use of piezo-electric elements with the same characteristics in the moving mechanism 17 and moving mechanism 77, or in the moving mechanism 373 and moving mechanism 372, is desirable in that such an arrangement allows easy setting of the driving voltages used to realize the above-mentioned fringe scan, as was described in the respective embodiments described above. However, piezo-electric elements with different characteristics may also be used, as long as these elements make it possible to realize the desired fringe scan with sufficient precision.

In particular, if piezo-electric elements equipped with a feedback mechanism that allows control of the driving voltage while measuring the amount of expansion or contraction are used as the piezo-electric elements in the respective embodiments described above, the linearity of the expansion and contraction can be increased, so that the positions of the reference surface and detected surface with respect to time can be linearly varied with a high degree of precision; accordingly, high-precision measurements are possible.

Industrial Applicability

The present invention can be used in a broad range of industrial fields as an interference measurement method and interferometer for measuring the shape of a detected surface.

What is claimed is:

1. An interference measurement method using an interferometer, the interferometer comprising:

an interference optical system which conducts light emitted from a light source to both a detected surface and a reference surface, and which causes interference between detected light that is generated by the reflection of the emitted light from the detected surface, and reference light that is generated by the reflection of the emitted light from the reference surface, and a light-receiving element which is disposed in a light path of an interference light formed by the detected light and the reference light, and which outputs interference signals corresponding to an intensity of an incident light, wherein said interference measurement method includes:

a modulation scanning procedure which creates a difference between the period of variation in the intensity of required signal components in the interference signals that vary according to the phase difference between the reference light and the detected light, and the period of variation in the intensity of coherent noise components that are generated as a result of noise light that has passed through portions of the light path of the detected light and the light path of the reference light, the modulation scanning procedure creates the difference by simultaneously varying both the optical distance of the detected-light light path and the optical distance of the reference-light light path during a scan that varies the phase difference between the detected light and the reference light, and a calculation procedure which determines the phase difference between the detected light and the reference light as shape information for the detected surface, on the basis of the interference signals that are output from the light-receiving element when the modulation scanning procedure is being performed.

2. The interference measurement method according to claim 1, wherein a ratio of an amount of variation in the optical distance of the detected-light light path to an amount of variation in the optical distance of the reference-light light path is maintained at 1:−1 in the modulation scanning procedure.

3. The interference measurement method according to claim 1, wherein a ratio of an amount of variation in the optical distance of the detected-light light path to an amount of variation in the optical distance of the reference-light light path is maintained at 1:3 or 3:1 in the modulation scanning procedure.

4. The interference measurement method according to any one of claims 1 through 3, wherein the scan is performed for a period equal to at least twice the period of the variation in the intensity of the required signal components in the modulation scanning procedure, and the shape information for the detected surface is determined on the basis of the interference signal corresponding to a period equal to at least twice the period of the variation in the intensity of the required signal components in the calculation procedure.

5. An interference measuring apparatus comprising:

an interference optical system which conducts light emitted from a light source to both a detected surface and a reference surface, and which causes interference between detected light that is generated by the reflection of the emitted light from the detected surface and reference light that is generated by the reflection of the emitted light from the reference surface, a light-receiving element which is disposed in a light path of an interference light formed by the detected light and the reference light, and which outputs interference signals corresponding to an intensity of an incident light, a moving means which simultaneously varies both the optical distance of the detected-light light path and the optical distance of the reference-light light path, a modulation scanning means which creates a difference between the period of variation in the intensity of required signal components in the interference signals that vary according to the phase difference between the reference light and the detected light, and the period of variation in the intensity of coherent noise components that are generated as a result of noise light that has passed through portions of the light path of the detected light and light path of the reference light, the modulation scanning means creates the difference by simultaneously varying both the optical distance of the detected-light light path and the optical distance of the reference-light light path by operation of the moving means during a scan that varies the phase difference between the detected light and the reference light, and a calculating means which determines the phase difference between the detected light and the reference light as shape information for the detected surface, on the basis of the interference signals output from the light-receiving element during the scan performed by the modulation scanning means.

6. The interference measuring apparatus according to claim 5, wherein the modulation scanning means has the function of maintaining a ratio of an amount of variation in the optical distance of the detected-light light path to an amount of variation in the optical distance of the reference-light light path at a ratio of 1:−1.

7. The interference measuring apparatus according to claim 5, wherein the modulation scanning means has the function of maintaining a ratio of an amount of variation in the optical distance of the detected-light light path to an amount of variation in the optical distance of the reference-light light path at a ratio of 1:3 or 3:1.

8. The interference measuring apparatus according to any one of claims 5 through 7, wherein the modulation scanning means performs the scan for a period equal to at least twice the period of the variation in the intensity of the required signal components, and the calculating means determines the shape information for the detected surface on the basis of the interference signals corresponding to a period that is at least twice the period of the variation in the intensity of the required signal components.

9. An interference measuring apparatus in which differences in a detected surface with respect to a reference surface are measured by emitting light from a light source and causing the light reflected from the detected surface that is the object of measurement to interfere with the light reflected from the reference surface, wherein the interference measuring apparatus has a light path length varying means that synchronously varies the respective light path lengths of the light rays that pass by way of the detected surface and the light rays that pass by way of the reference surface.

* * * * *